(12) United States Patent
Petit et al.

(10) Patent No.: US 11,590,874 B2
(45) Date of Patent: Feb. 28, 2023

(54) VEHICLE SEAT SUPPORT, SEAT ASSEMBLY COMPRISING SUCH A SUPPORT, AND METHOD FOR MOUNTING IN A VEHICLE

(71) Applicant: FAURECIA Sièges d'Automobile, Nanterre (FR)

(72) Inventors: Fabrice Petit, Saint Georges des Groseillers (FR); Michel Timon, Le Vey (FR); Guillaume Petot, La Ferrière aux Etangs (FR); Franck Jeunehomme, Miontherme (FR); Philippe Marcq, Mouzon (FR); Pascal Glautin, Charleville-Mezieres (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 120 days.

(21) Appl. No.: 17/137,566

(22) Filed: Dec. 30, 2020

(65) Prior Publication Data

US 2021/0206303 A1    Jul. 8, 2021

(30) Foreign Application Priority Data

Jan. 3, 2020   (FR) .................................... 2000036

(51) Int. Cl.
   *B60N 2/02*    (2006.01)
   *B60N 2/90*    (2018.01)
   *B60N 2/06*    (2006.01)

(52) U.S. Cl.
   CPC ........... *B60N 2/995* (2018.02); *B60N 2/0232* (2013.01); *B60N 2/067* (2013.01); *B60N 2002/0236* (2013.01)

(58) Field of Classification Search
   CPC ...... B60N 2/995; B60N 2/0232; B60N 2/067; B60N 2/06; B60N 2002/0236
   USPC ...................................................... 297/344.1
   See application file for complete search history.

(56) References Cited

U.S. PATENT DOCUMENTS

| | | | |
|---|---|---|---|
| 3,059,960 A * | 10/1962 | Komorowski | G05G 1/40 296/75 |
| 9,114,733 B2 | 8/2015 | Pluta | |
| 2007/0176456 A1 | 8/2007 | Ohtsubo | |
| 2018/0339632 A1* | 11/2018 | Akaike | B60N 2/995 |

FOREIGN PATENT DOCUMENTS

| | | | |
|---|---|---|---|
| CN | 108928283 | | 12/2018 |
| DE | 102017212219 A1 * | | 1/2019 |
| EP | 1533190 A | | 5/2005 |
| JP | H09295534 | * | 11/1997 |
| JP | 2000023782 | * | 1/2000 |
| JP | 2021046004 | * | 9/2019 |
| KR | 20060010467 A | | 2/2006 |
| WO | 2012028235 A2 | | 3/2012 |

* cited by examiner

*Primary Examiner* — Mark R Wendell
(74) *Attorney, Agent, or Firm* — Barnes & Thornburg LLP

(57) ABSTRACT

A vehicle seat support comprising two rails extending in a longitudinal direction, a central module slidably mounted on the rails and suitable for supporting the vehicle seat, a footrest slidably mounted on the rails in front of the central module and suitable for receiving the feet of an occupant seated on the seat, a first actuation system able to cause the central module to slide along the rails, and a second actuation system able to cause the footrest to slide along the rails independently of the central module.

22 Claims, 22 Drawing Sheets

VEHICLE SEAT SUPPORT, SEAT ASSEMBLY COMPRISING SUCH A SUPPORT, AND METHOD FOR MOUNTING IN A VEHICLE

PRIORITY CLAIM

This application claims priority to French Patent Application No. 2000036, filed Jan. 3, 2020, which is expressly incorporated by reference herein.

BACKGROUND

The present disclosure relates to vehicle seat supports, seat assemblies comprising such supports, and methods for mounting such supports in a vehicle. More particularly, the present disclosure relates to vehicle seat supports comprising two parallel rails on which the vehicle seat can slide, and a footrest.

SUMMARY

According to the present disclosure, a vehicle seat support comprises:

a first rail extending between a rear end and a front end in a longitudinal direction, a second rail parallel to the first rail and extending between a rear end and a front end, the first rail and the second rail being intended to be attached to a floor of the vehicle, a central module which is slidably mounted on the first rail and second rail and which is suitable for supporting the vehicle seat, a footrest slidably mounted on the first rail and second rail between the respective front ends of the first and second rails and the central module, the footrest being suitable for receiving the feet of an occupant seated on the seat, a first actuation system able to cause the central module to slide along the first rail and second rail, and a second actuation system able to cause the footrest to slide along the first rail and second rail independently of the central module.

With these arrangements, the seat occupant can actuate the position of the seat and the position of the footrest independently of each other, which allows the user to easily choose the position of the assembly that is the most comfortable for him or her. Optionally, control of the two actuation systems may be coordinated by an electronic control device such as a central processing unit controlling the two actuation systems, but in all cases, the two actuation systems are mechanically independent of each other.

In illustrative embodiments, the electronic control device allows any one or more of the following configurations for the vehicle seat support:

A "morphological adaptation" mode, in which the advancement (respectively the retreat) of the footrest along the rails takes place with a retreat (respectively an advancement) of the seat, for example simultaneously. This configuration is particularly suitable for accommodating a variety of occupant sizes.

A "preservation" mode, in which the advancement (respectively the retreat) of the footrest along the rails takes place with an advancement (respectively a retreat) of the seat, for example simultaneously. For example, this configuration makes it possible to maintain the same distance between the footrest and the seat when the passenger shifts forward or back longitudinally.

A "comfort" mode, in which the advancement (respectively the retreat) of the footrest along the rails takes place with a retreat of the seat and a rearward tilting of the seat's backrest (respectively an advancement of the seat and a forward tilting of the seat's backrest), for example simultaneously. This configuration is particularly suitable for changing from a nominal configuration to a comfort position, and vice versa.

The use of an electronic control device to coordinate the two actuation systems, which are independent of each other, thus allows implementing several modes for the movement of the seat and footrest in order to provide increased flexibility and ease of use for the user. Each of these modes is obtained by actuating an actuator (for example a button) which controls the electronic control device.

In illustrative embodiments, the central module comprises a first plate which is suitable for partially covering the floor of the vehicle, and the footrest comprises a second plate which is suitable for partially covering the floor of the vehicle, the first plate and second plate being arranged to overlap such that the floor of the vehicle is covered by the first plate and the second plate between the central module and the footrest regardless of the relative position of the central module and the footrest.

The reliability of the assembly is thus improved, because the passenger's feet can also rest on the second plate and there is no chance of them interfering with the sliding of the footrest or the rails.

In illustrative embodiments, the first rail and second rail each comprise at least one flap respectively covering the rail between the central module and the footrest.

The reliability of the assembly is thus improved, because the rails are protected against the entry of foreign bodies into the rails which could interfere with the sliding of the footrest and/or of the central module.

Optionally, the at least one flap may be arranged obliquely relative to the horizontal, on an open face of the corresponding rail.

In illustrative embodiments, the at least one flap is sized and arranged to entirely cover the rail between the central module and the footrest.

In illustrative embodiments, the at least one flap is integral with a first member chosen among the central module and the footrest, and is arranged to engage under a lateral portion integral with a second member chosen among the central module and the footrest.

In illustrative embodiments, the first rail and second rail each comprise a first flap and a second flap which together cover the rail between the central module and the footrest, the first flap and second flap respectively being connected to the central module and to the footrest.

For example, the first flap and second flap are mounted so as to overlap when the central module and the footrest move closer to each other.

For example, the first flap is mounted so as to slide along the longitudinal direction relative to the central module and is resiliently biased towards the second flap, and/or the second flap is mounted so as to slide along the longitudinal direction relative to the footrest and is resiliently biased towards the first flap, the first flap and second flap being suitable for abutting axially against one another by causing the first flap and/or the second flap to slide when the central module and the footrest move closer to each other.

In illustrative embodiments, the first actuation system comprises at least one motor.

For example, the first actuation system comprises a first motor suitable for driving the central module on the first rail and a second motor suitable for driving the central module on the second rail (advantageously, the two motors are controlled synchronously).

The sliding of the central module on the rails is thus more reliable.

In illustrative embodiments, the second actuation system comprises at least one motor.

In illustrative embodiments, the footrest is mounted on a support which comprises a first shuttle able to slide on the first rail and a second shuttle able to slide on the second rail, the first shuttle and second shuttle being interconnected by at least one rigid structure, the motor being carried by the rigid structure.

Optionally, the support structure may comprise at least one crossmember integral with the two shuttles, and the motor is attached to the crossmember.

In illustrative embodiments, the central module comprises a rigid structure which is integral with two sliders mounted so as to slide respectively along the two rails.

In illustrative embodiments, the first rail and second rail are secured together by at least one transverse structure and are held parallel by the central module and the footrest.

The present disclosure also relates to a seat assembly comprising a vehicle seat support according to this description and a vehicle seat which is mounted on the central module.

Finally, the present disclosure also relates to a method for mounting an assembly as defined above, comprising at least the following steps:

preliminary assembling of a first assembly comprising the first rail, the second rail, a transverse structure integrally secured to the first rail and to the second rail, and at least one rigid support structure that is part of the central module or of the footrest, the support structure being integral with two members respectively slidably mounted on the first rail and on the second rail, attachment of the first assembly to the floor of the vehicle.

In illustrative embodiments, during the preliminary assembling step, the central module is mounted on the rails by a first rigid support structure integral with two sliders respectively slidably mounted on the first rail and on the second rail, and the footrest is mounted on the rails by a second rigid support structure integral with two shuttles respectively slidably mounted on the first rail and on the second rail.

Optionally, during the preliminary assembling step, the seat can be mounted on the central module.

Optionally, during the preliminary assembling step, at least one cable is placed in at least one of the rails, the at least one cable being connected to the first actuation device and to the second actuation device, and the at least one cable is connected to the vehicle during attachment of the first assembly to the floor of the vehicle.

In illustrative embodiments, the vehicle seat support according to this description could comprise a single rail instead of two rails. In this case, the vehicle seat support comprises:

a rail extending between a rear end and a front end in a longitudinal direction, the rail being intended to be attached to a floor of the vehicle, a central module which is slidably mounted on the rail and which is suitable for supporting the vehicle seat, a footrest mounted on the rail so as to slide between the front end of the rail and the central module, the footrest being suitable for receiving the feet of an occupant seated on the seat, a first actuation system able to cause the central module to slide along the rail, and a second actuation system able to cause the footrest to slide along the rail independently of the central module.

Finally, the vehicle seat support according to this description could comprise one or two rails for guiding the central module and one or two other rails for guiding the footrest in the longitudinal direction. In this case, the vehicle seat support comprises:

at least one seat guide rail extending between a rear end and a front end in a longitudinal direction, at least one footrest guide rail extending between a rear end and a front end in the longitudinal direction, the seat guide rail and the footrest guide rail being intended to be attached to a floor of the vehicle, a central module which is slidably mounted on the seat guide rail and which is suitable for supporting the vehicle seat, a footrest slidably mounted on the footrest support rail, the footrest being suitable for receiving the feet of an occupant seated on the seat, a first actuation system able to cause the central module to slide along the seat guide rail, and a second actuation system able to cause the footrest to slide along the footrest guide rail independently of the central module.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
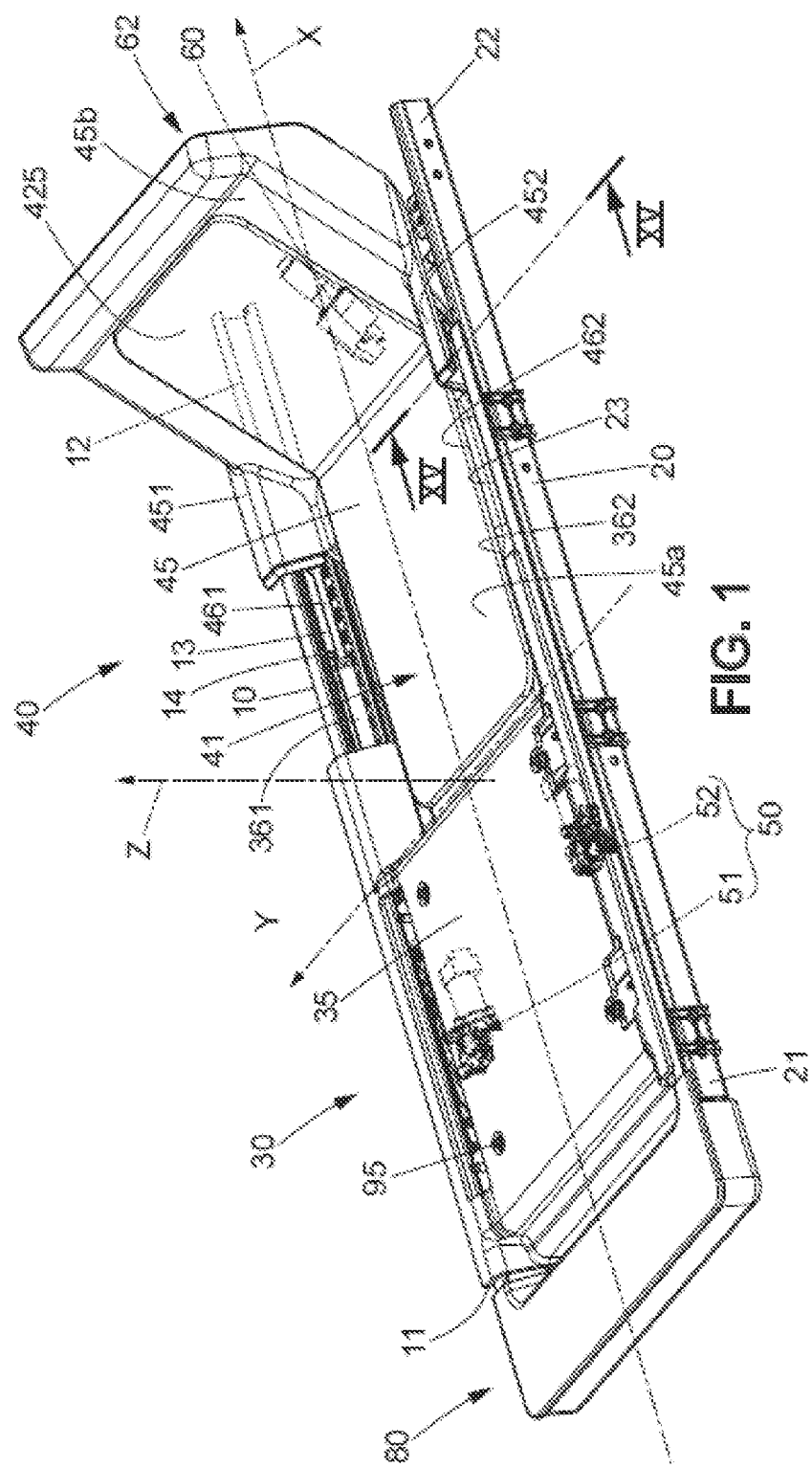
FIG. 1 is a perspective view of a vehicle seat support according to this description.

FIG. 1 shows a perspective view of a vehicle seat support which is suitable for carrying a seat 90 (shown in FIG. 18) of a vehicle and which comprises a footrest 40. The footrest 40 enables the occupant of the seat to rest his or her feet while seated on the seat.

The vehicle seat support comprises a pair of parallel rigid rails, for example of metal, extending in a longitudinal direction X, namely a first rail 10 extending between a rear end 11 and a front end 12, and a second rail 20 extending between a rear end 21 and a front end 22. These rails are intended to be attached to the floor (not shown) of the vehicle. The direction "forward-rearward" and the adjectives "front" and "rear" are defined relative to the direction of the longitudinal axis X. The rails 10, 20 are arranged opposite one another in a transverse direction Y which is perpendicular to the longitudinal direction X, the XY plane being horizontal. The terms "above"/"over" and "below"/"under" are defined relative to a vertical axis Z perpendicular to the XY plane, the X, Y, and Z axes forming an orthogonal frame of reference. The term "interior" designates the part of an element which is directed towards the middle (the interior) of the assembly, in other words towards the longitudinal axis X which divides the assembly into two symmetrical parts.

As is visible in particular in FIGS. 1, 3-4, 6, 10-11, and 13, the first rail 10 and second rail 20 may be metal profiles each having for example a C-shaped cross-section (in a plane perpendicular to the longitudinal axis X). For example, as shown in the figures, the open face of the first rail 10, which extends longitudinally between its two ends 11, 12, is directed towards the interior of the assembly, at an angle to the transverse axis Y. Similarly, the open face of the second rail 20, which extends longitudinally between its two ends 21, 22, is directed towards the interior of the assembly, at an angle to the transverse axis Y. Thus, in the example shown, each of these two open faces is directed obliquely upwards (positive direction of the Z axis), forming a V between them.

More particularly, the first rail 10 has a first opening 13 which extends longitudinally between its two ends 11, 12 and which is directed towards the interior of the assembly. Similarly, the second rail 20 has a second opening 23 which extends longitudinally between its two ends 21, 22 and which is directed towards the interior of the assembly. The first opening 13 and second opening 23 are located opposite one another along the entire length of the rails 10, 20.

Figure 18:
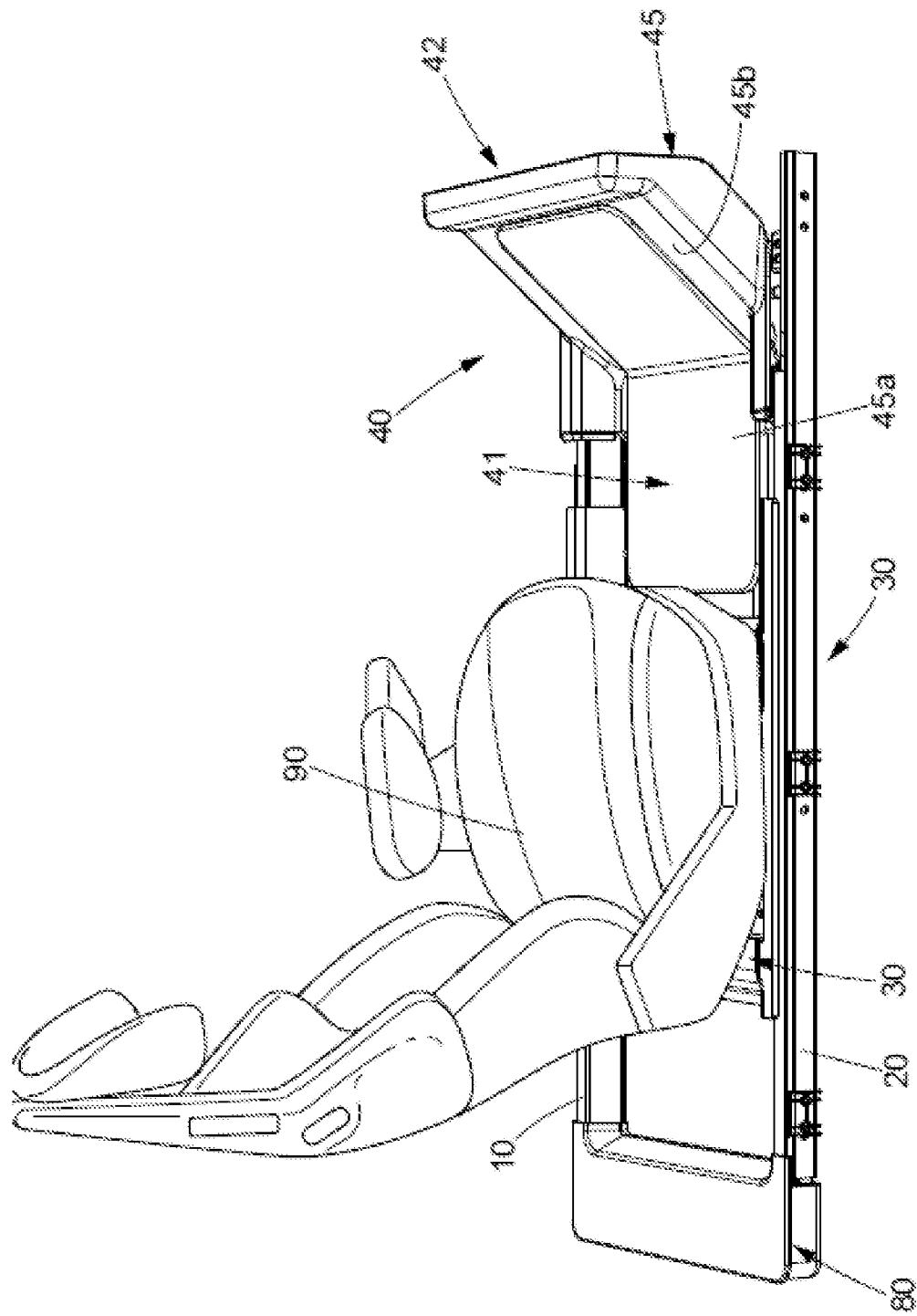
FIG. 18 is a view of the vehicle seat support of FIG. 1, with a seat mounted on the central module.

The assembly also comprises a central module 30 which is slidably mounted on the rails 10, 20 and on which a seat 90 is intended to be fixed. The seat 90 is therefore integral with the central module 30, as illustrated in FIG. 18.

The central module 30 may comprise a first rigid plate 35, for example of metal, which covers the entire module 30. The first plate 35 generally lies in the XY plane. The first plate 35 may extend transversely between the two rails 10, 20 so as to cover the vehicle floor between the two rails 10, 20.

The seat 90 is attached on the central module 30 by mechanical attachments 95 (visible in FIG. 1). For example, these attachments 95 are arranged at the four vertices of a rectangle, in other words each near one of the corners of the first plate 35 which covers the central module 30. The attachments 95 may for example be screws/nuts. Alternatively, the attachments 95 are threaded holes enabling the seat to be attached by screwing.

Figure 3:
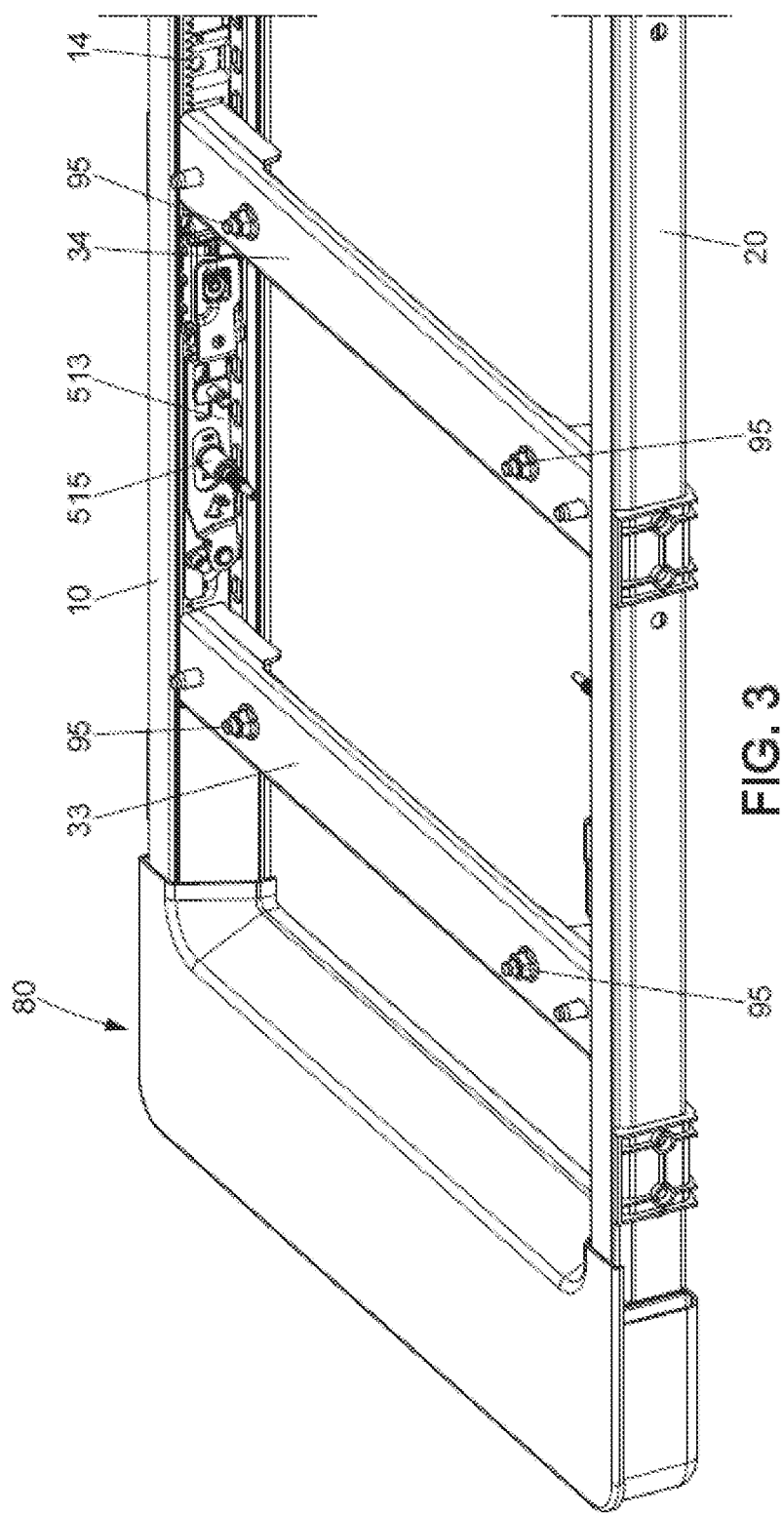
FIG. 3 is a perspective view of the central module of the vehicle seat support of FIG. 1, without the plate covering the central module.
Figure 4:
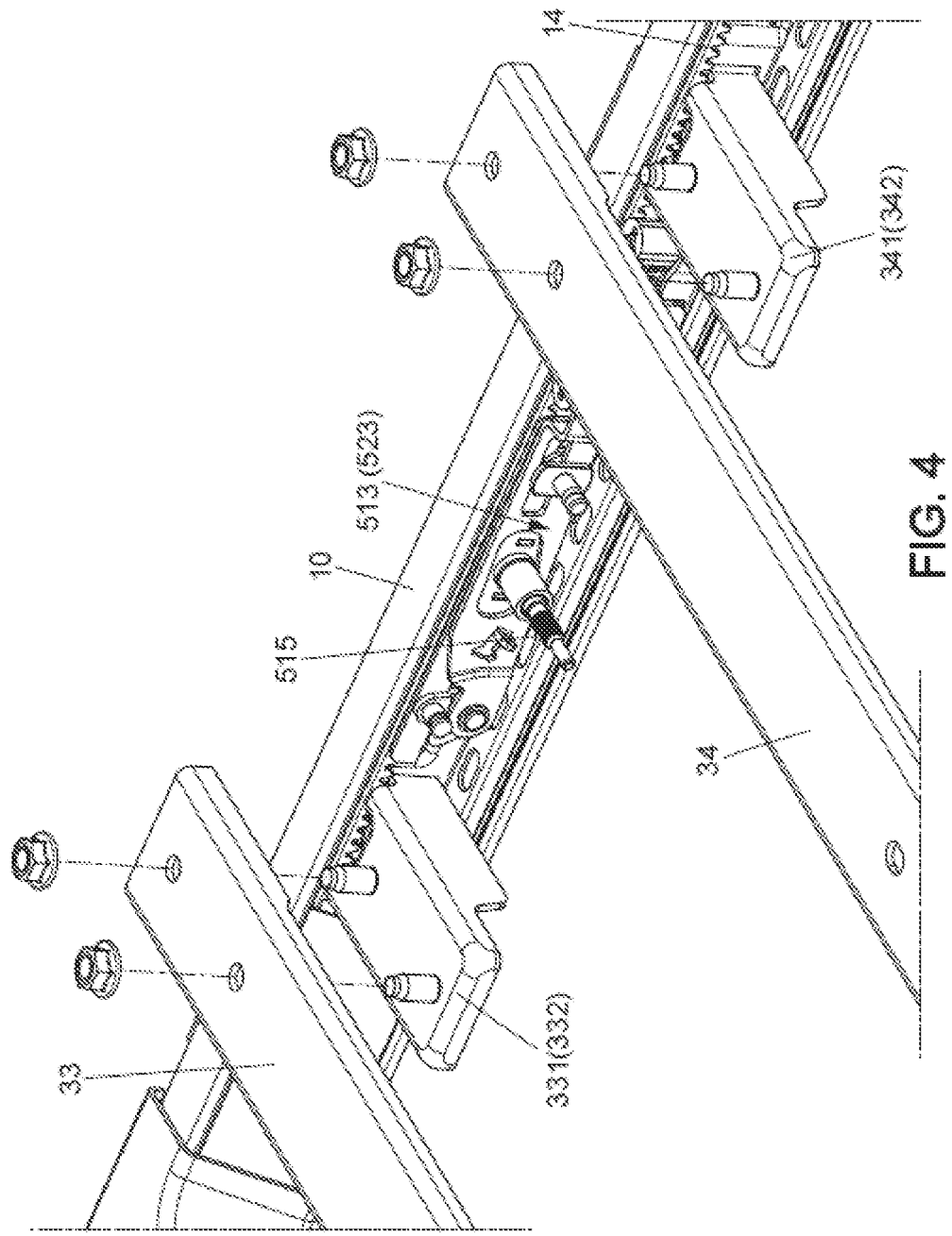
FIG. 4 is an exploded perspective view showing the slidable mounting of the central module on the rails of the vehicle seat support of FIG. 1.
Figure 16:
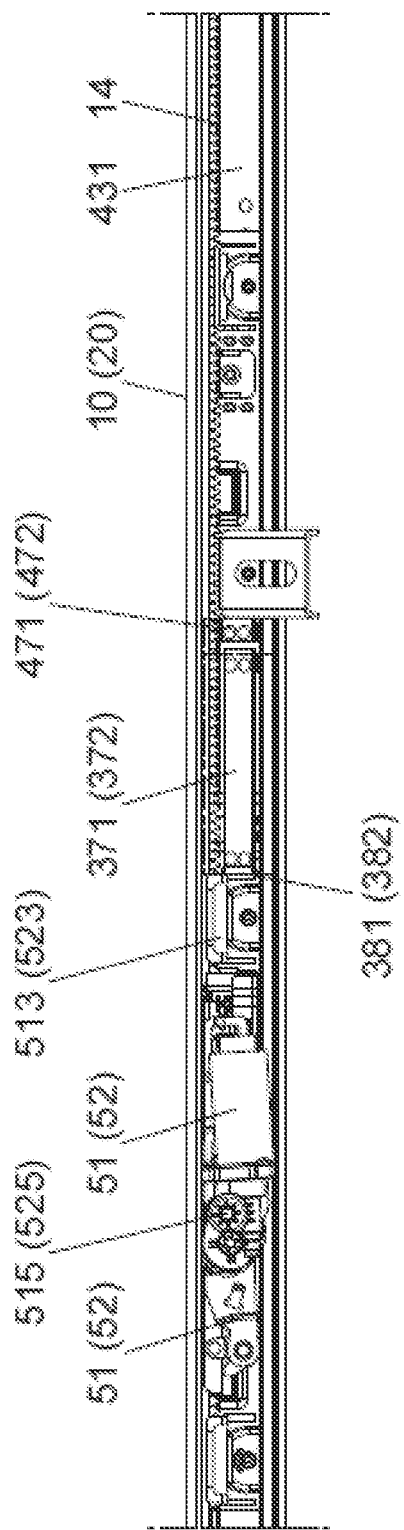
FIG. 16 is a side view of a rail of the vehicle seat support, showing a second embodiment, with the central module and the footrest in a position where they are close to one another.
Figure 17:
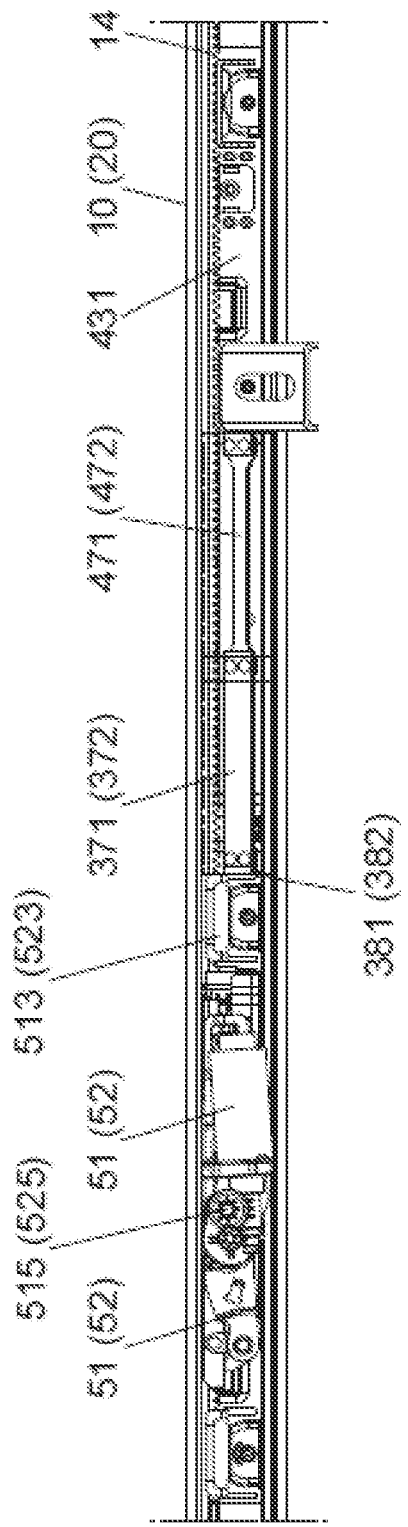
FIG. 17 is a side view of a rail of the vehicle seat support in the second embodiment, with the central module and the footrest in a position where they are distanced from one another.

The central module 30 is mounted on sliders 513, 523 which are respectively mounted so as to slide on the rails 10, 20 (see FIGS. 3 and 4, as well as FIGS. 16 and 17). The first slider 513 comprises, for example, rollers 513a which rest on the lower portion of the first rail 10 to enable such sliding. These rollers are visible in FIG. 8. The other slider 523 comprises similar rollers. The term "slider" is not limited to a particular shape or to a particular mounting on the rails 10, 20: it designates any element mounted so as to slide along one of the rails 10, 20 in the X direction.

The sliding of the central module 30 along the rails 10, 20 is achieved by a first actuation system 50. For example, the first actuation system 50 comprises at least one electric motor, which allows automatic movement of the central module 30. In the example shown, the first actuation system 50 may comprise a first motor 51 which is able to drive slider 513 on the first rail 10 (in particular, the first motor 51 may control (via a rod 515) a pinion (not shown) engaged with a rack 14 that is part of the first rail 10) and a second motor 52 which is able to drive slider 523 on the second rail 20 (in particular, the second motor 52 may control (via a rod 525) a pinion (not shown) engaged with a rack 14 that is part of the second rail 20). The first motor 51 and second motor 52 are visible in FIGS. 1 and 2 (see below). The rails 10, 20, motors 51, 52, and sliders 513, 523 may for example be as described in patent application FR1900015 filed on Jan. 2, 2019. The motors 51, 52 are advantageously controlled synchronously.

Alternatively, the actuation system 50 could be manual.

The first plate 35 helps protect the mechanical elements of the central module 30 (in particular the actuation system 50).

Figure 2:
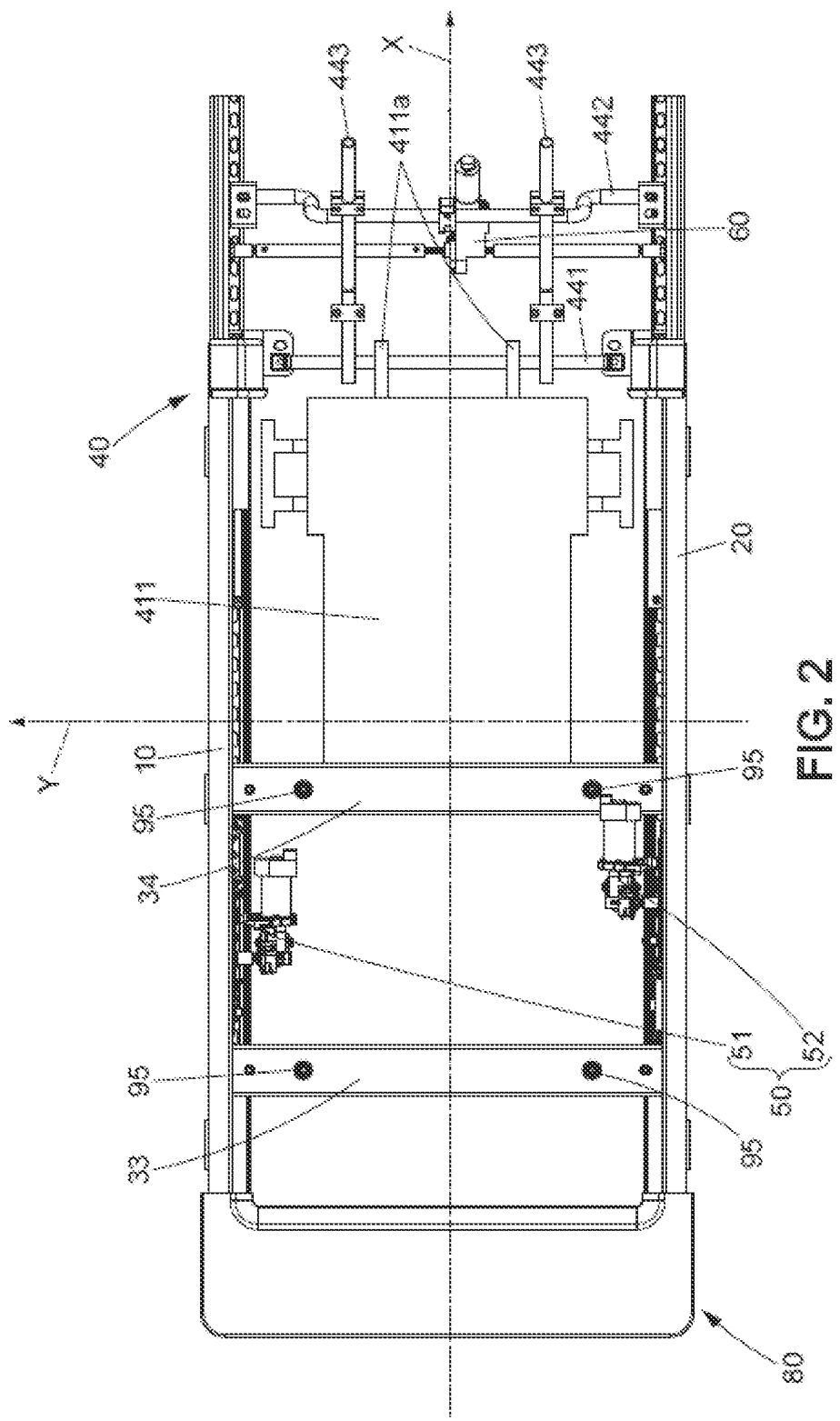
FIG. 2 is a top view of the vehicle seat support of FIG. 1, without the plate covering the central module or the shell covering the footrest.

FIGS. 2 and 3 show the support structure of the central module 30. The central module 30 comprises a transverse rear rigid crossmember 33 (for example of metal) and a transverse front rigid crossmember 34 (for example of metal) which each extend from the first rail 10 to the second rail 20. The crossmembers 33, 34 are each attached to the slider 513 of the first rail 10 and to the slider 523 of the second rail 20. The attachments 95 which hold the seat 90 on the central module 30 attach the seat 90 and the first plate 35 to the rear crossmember 33 and front crossmember 34. For clarity, the motor 51 does not appear in FIG. 3. One will note that the central module 30 could comprise any other rigid support structure interconnecting the sliders 513, 523. Such a structure could for example comprise a single crossmember instead of two, or could take any other form.

FIG. 4 details an example attachment of the rear crossmember 33 and front crossmember 34 on the slider 513 which slides in the first rail 10. For clarity, the motor 51 does not appear in FIG. 4. One end of the rear crossmember 33 is attached by a mechanical connection (for example screw/nut as illustrated) to a rear tab 331 integral with the slider 513. The rear tab 331 extends for example transversely towards the interior of the vehicle seat support, from its distal end where it is attached to the slider 513. Similarly, one end of the front crossmember 34 is attached by a mechanical connection (for example screw/nut as illustrated) on a front tab 341. The front tab 341 extends for example transversely towards the interior of the vehicle seat support, from its distal end where it is attached to the slider 513.

The rear transverse bar 33 and the front transverse bar 34 are similarly mounted on the slider 523 which slides in the second rail 20. The above description of slider 513, rear tab 331, and front tab 341 is therefore valid for the attachment of the bars 33, 34 on the other slider 523, respectively replacing the references 10, 331, and 341 with the references 20, 332, and 342 in the above description. These latter references are indicated in parentheses in FIG. 4.

Figure 5:
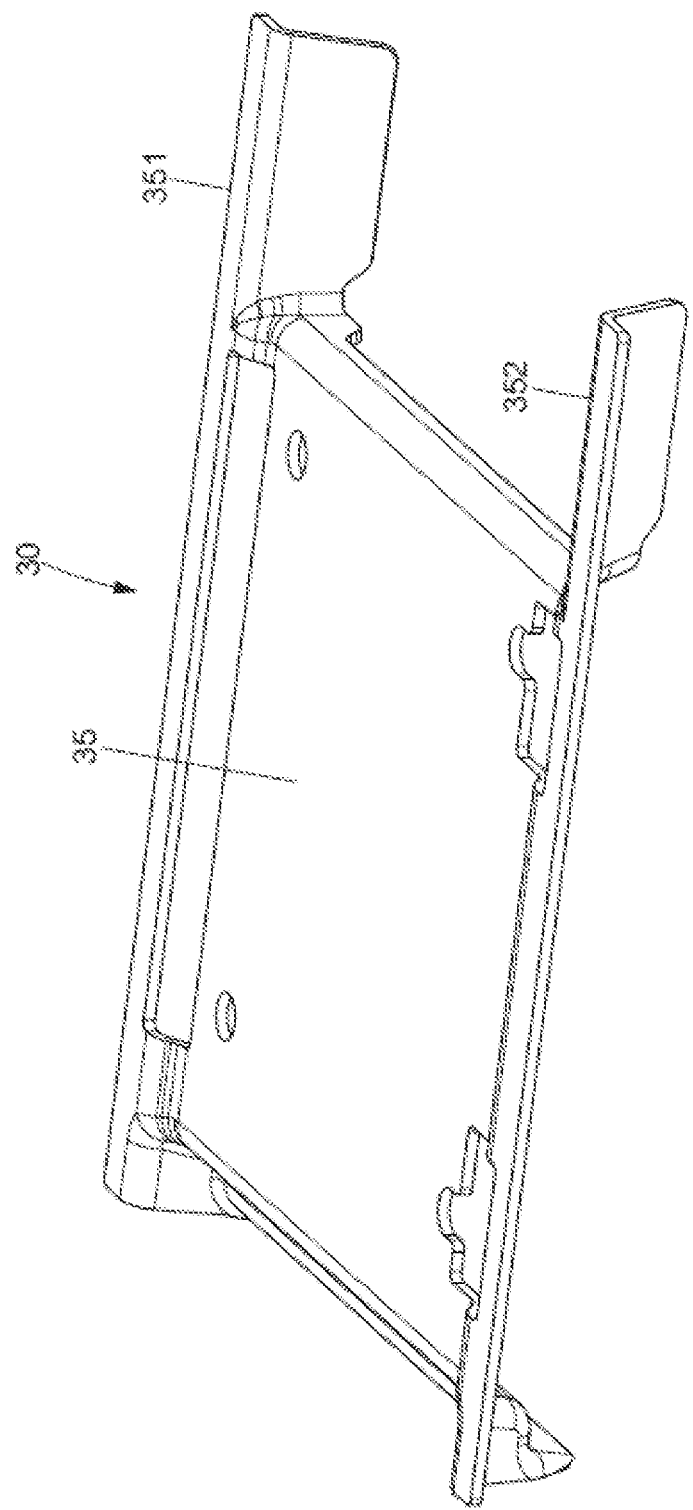
FIG. 5 is a perspective view of the plate covering the central module of the vehicle seat support of FIG. 1.
Figure 6:
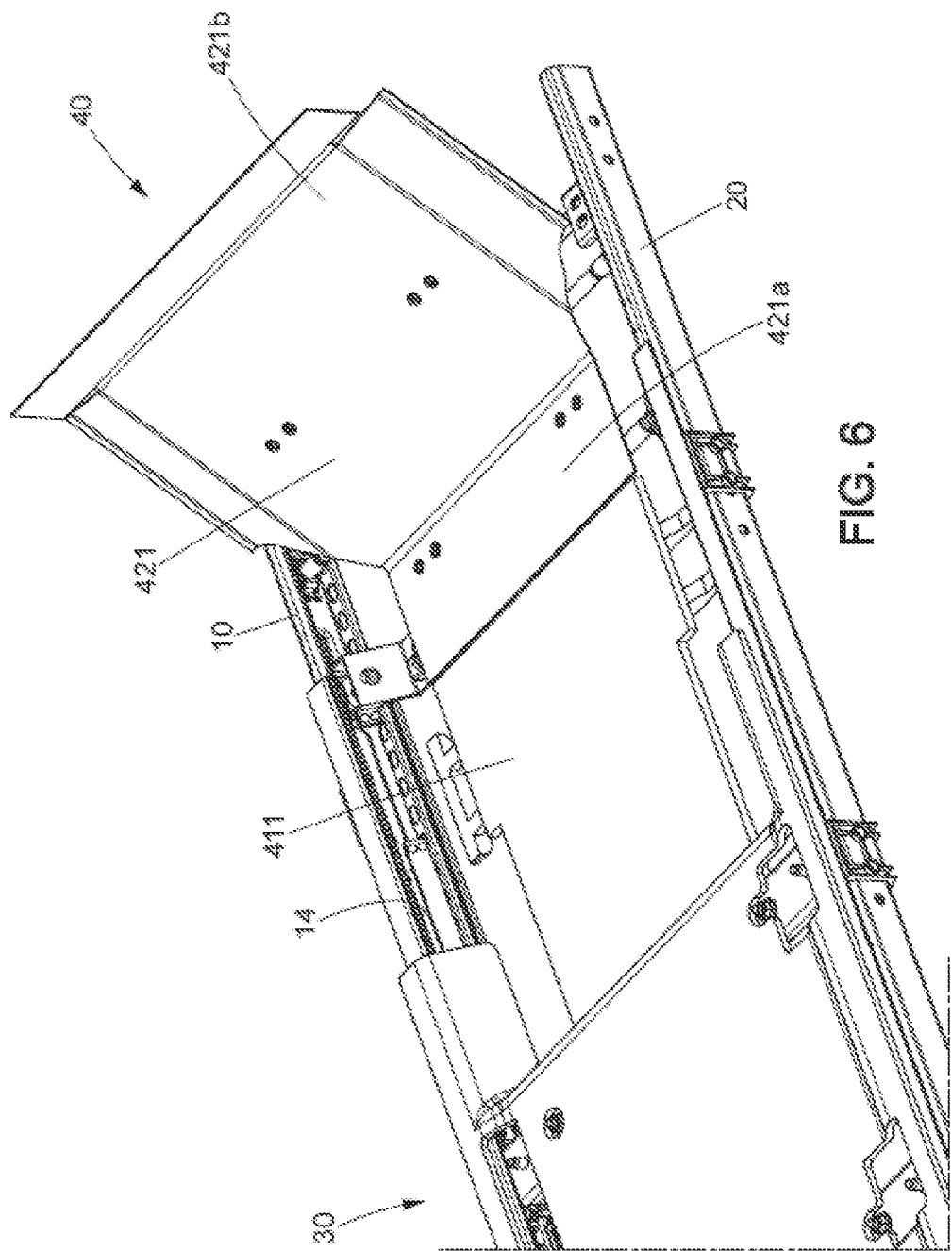
FIG. 6 is a perspective view of the footrest of the vehicle seat support of FIG. 1, without the shell covering the footrest.

FIGS. 5 and 6 show the structure of the first plate 35. At its lateral edge which covers the first rail 10, the first plate 35 may be extended forward along this first rail 10 by a longitudinal protuberance 351. This protuberance 351 covers part of the first rail 10, at least at the top and towards the interior of the vehicle seat support, and contributes, along with a primary flap 361 (see below), to covering the first rail 10 in order to eliminate or reduce the risk of foreign bodies entering the first rail 10 and the risk of injury to users by the first rail 10. The longitudinal protuberance 351 covers at least the rear end of the primary flap 361.

Similarly, the first plate 35 is extended forward along the second rail 20 by another longitudinal protuberance 352, at its other lateral edge which covers the second rail 20. This other protuberance 352 covers part of the second rail 20, at least at the top and towards the interior of the vehicle seat support, and contributes, along with a primary flap 362 (see below), to hiding the second rail 20 between the module 30 and the footrest 40. Longitudinal protuberance 352 covers at least the rear end of primary flap 362. The longitudinal protuberances 351, 352 have an inner face which is directed towards the interior of the assembly and which covers the opening 13, 23 of the rail 10, 20, and an upper face which covers the upper part of the rail 10, 20. This inner face may be oblique, in particular if the opening 13, 23 of the rail 10, 20 opens obliquely upwards (at an angle relative to the transverse axis Y, as shown in the figures). Alternatively, this inner face may be vertical, in particular if the opening 13, 23 of the rail 10, 20 opens horizontally in the XY plane. The protuberances 351, 352 are also visible in FIG. 12.

The assembly also comprises a footrest 40 which comprises a body 41 which is slidably mounted on the rails and a longitudinal extension 42 which is intended to receive the feet of an occupant seated on the seat. The footrest 40 is located in front of the central module 30. The body 41 therefore slides between the front ends (12, 22) of the rails (10, 20) and the central module 30. The body 41 extends from the first rail 10 to the second rail 20. The longitudinal extension 42 is integral with the body 41 such that the extension 42 slides with the body 41 as a single unit along the rails 10, 20. The longitudinal extension 42 extends the body 41 of the footrest 40 forward along the longitudinal direction X, in other words in the direction opposite to the central module 30. The body 41 and the extension 42 cover a portion of the floor located between the rails (10, 20). As illustrated in FIG. 1, the upper face 425 (which may be flat) of the extension 42, on which the passenger's feet are intended to rest, forms a fixed angle with the horizontal plane XY. Alternatively, the extension 42 could be pivotally mounted on the body 41 by a pivoting connection (along the transverse axis Y) such that this upper face 425 is able to be in various orientations relative to the horizontal plane XY. In this case, a manual or motorized mechanism allows adjusting the tilt of the extension 42.

The construction of the footrest 40 is detailed below, with reference to FIGS. 1 and 6 to 10.

Figure 10:
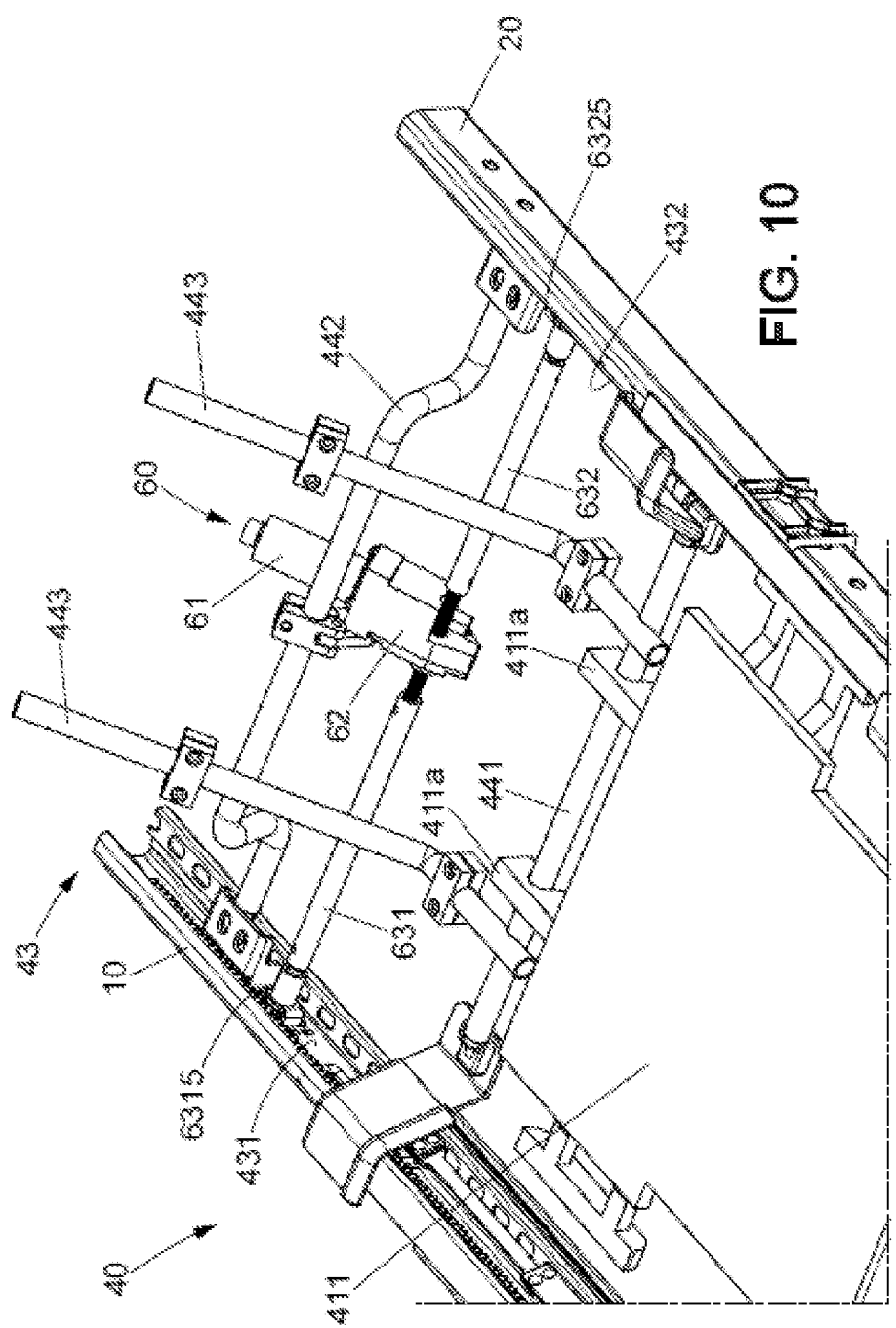
FIG. 10 is a perspective view of the structure of the footrest of the vehicle seat support of FIG. 1.

The body 41 and the extension 42 are mounted on a support 43, clearly visible in FIG. 10. The support structure 43 is composed of rigid parts, for example of metal. The support 43 comprises a first shuttle 431 which is able to slide along the X direction in the first rail 10 and a second shuttle 432 which is able to slide along the X direction in the second rail 20. Thus, the first shuttle 431 is housed in the internal space of the first rail 10, and the second shuttle 432 is housed in the internal space of the second rail 20. The first shuttle 431 comprises rollers 431a which rest on the lower part of the first rail 10 to enable this sliding. These rollers are visible in FIG. 8 and FIG. 14. The second shuttle 432 comprises similar rollers. The first shuttle 431 and second shuttle 432 are interconnected by a rigid support structure which comprises for example a rear crossmember 441 and a front crossmember 442. In addition, these crossmembers 441, 442 are secured to frames 443, for example two in number, which each extend in the longitudinal vertical plane XZ and which are perpendicular to the crossmembers 441, 442. Of course, the shape of the support structure is not limited to this particular example, and the term "shuttle" is not limited to a particular shape or to a particular mounting on the rails 10, 20: it designates any element mounted so as to slide along one of the rails 10, 20 in the X direction.

Figure 11:
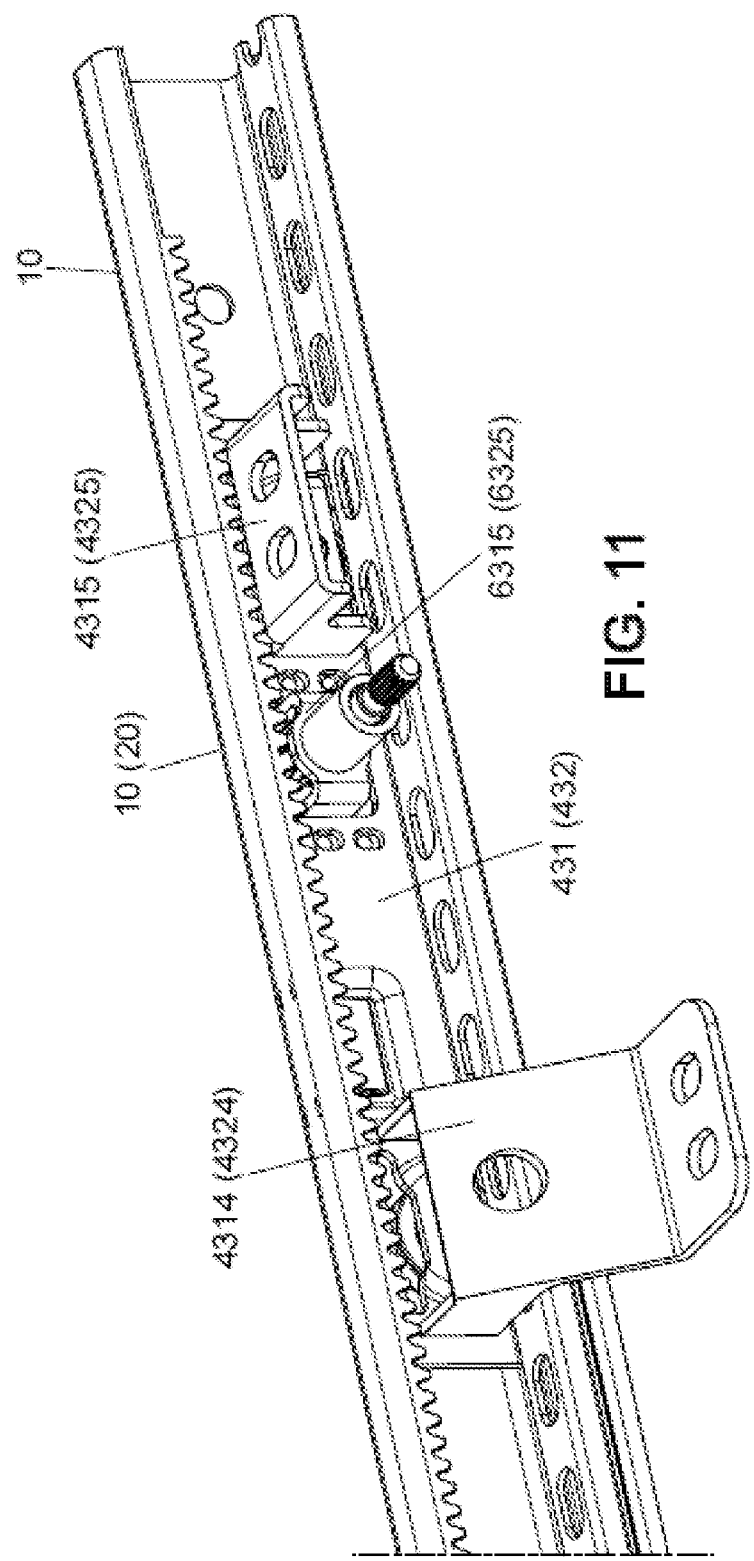
FIG. 11 is a perspective view showing the slidable mounting of the footrest of the assembly of FIG. 1.

The connection of the crossmembers 441, 442 to the shuttles 431, 432 is now described in more detail with reference to FIG. 11. FIG. 11 illustrates the connection between the first shuttle 431 and the first rail 10. For clarity, the crossmembers 441, 442 are not shown. The first shuttle 431 comprises a rear tab 4314 to which one end of the rear crossmember 441 is mechanically attached (for example by screw/nut). The first shuttle 431 also comprises a front tab 4315 to which one end of the front crossmember 442 is mechanically attached (for example by screw/nut). These tabs (4314, 4315) extend towards the interior of the vehicle seat support. The above description of shuttle 431, tab 4314, and tab 4315 is valid for the other shuttle 432 but respectively replacing the references 10, 431, 4314, 4315, and 6315 by the references 20, 432, 4324, 4325, and 6325 in the above description. These latter references are indicated in parentheses in FIG. 11.

The sliding of the footrest 40 along the rails is achieved by a second actuation system 60 visible in FIGS. 1, 2, 7, 10.

The second actuation system 60 allows automatic movement of the footrest 40. The second actuation system 60 comprises at least one electric motor 61, which is carried for example by the front crossmember 442. The second actuation system 60 further comprises a drive mechanism which is connected to the motor 61. The drive mechanism may for example comprise a transmission 62 driven by the motor 61 (for example mounted in the same housing as the motor 61), a first drive shaft 631, and a second drive shaft 632. The first drive shaft 631 extends from the transmission 62 to the first rail 10 along the transverse direction Y, and the second drive shaft 632 extends from the transmission 62 to the second rail 20 along the transverse direction Y. The end of the first drive shaft 631 at the first rail 10 comprises a first pinion 6315 engaging with the aforementioned rack 14, and the end of the second drive shaft 632 at the second rail 20 comprises a second pinion 6325 engaging with the aforementioned rack 14. The transmission 62 imparts (for example by gears) the rotation of the motor 61 to each of the drive shafts 631, 632.

Actuation system 60 is actuated independently of actuation system 50. The sliding of the footrest 40 thus takes place independently of the sliding of the central module 30, such that a relative positioning of the central module 30 and of the footrest 40 can be performed by the passenger in the seat. Passenger comfort is thus optimal.

As shown in FIGS. 1, 6, 7 and 8, the body 41 of the footrest 40 comprises a rigid base 411 (made for example of plastic) which is attached at its front end to the rear crossmember 441 of the support structure 43. The base 411 may be flat. The extension 42 comprises a rigid base 421 (made for example of plastic) which is attached to the frames 443. The base 421 comprises a horizontal portion 421a which extends the base 411 and an inclined portion 421b which extends forward and upward from the horizontal portion.

Figure 8:
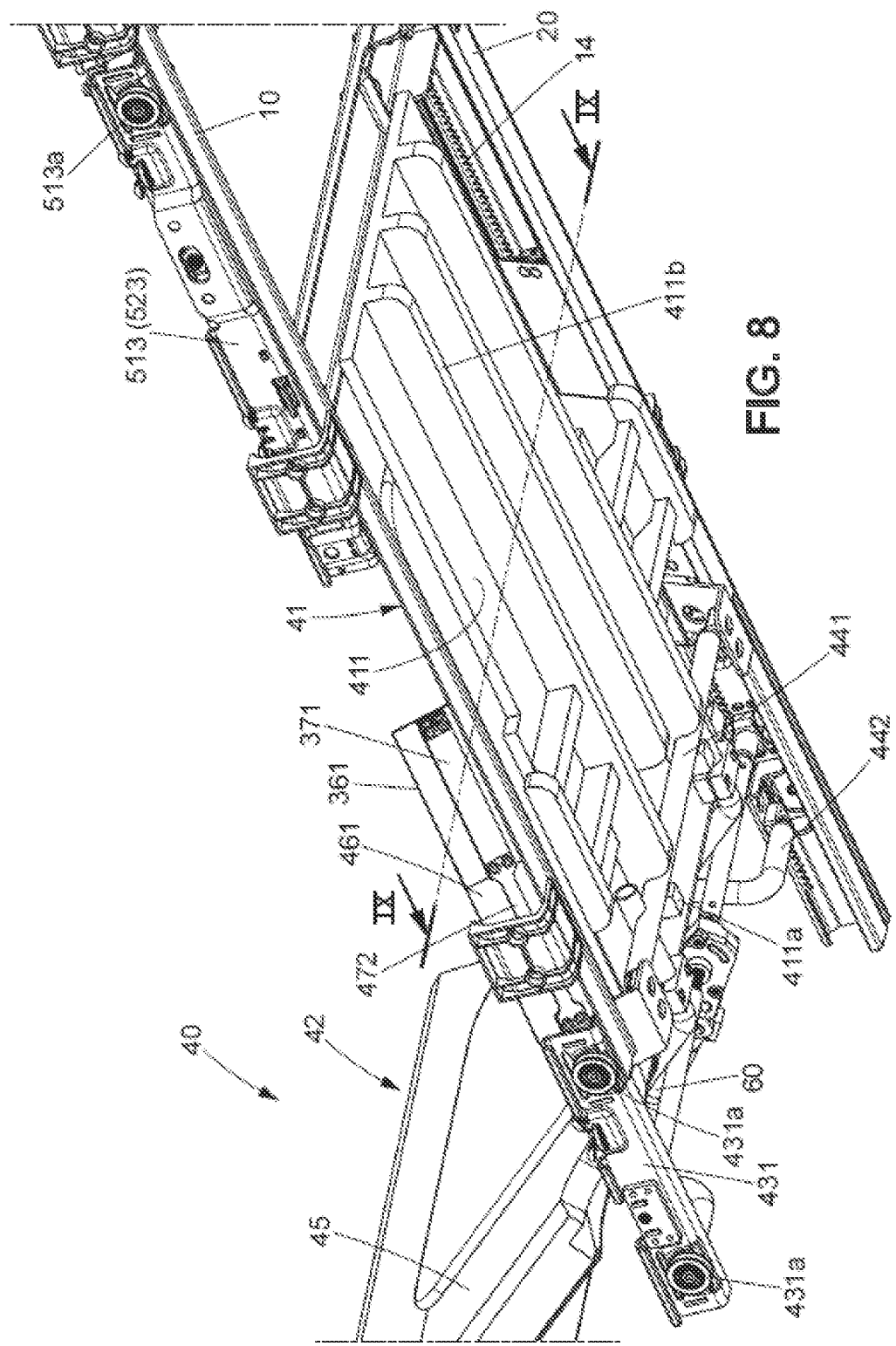
FIG. 8 is a perspective view from below, showing the lower portion of the footrest.
Figure 9:
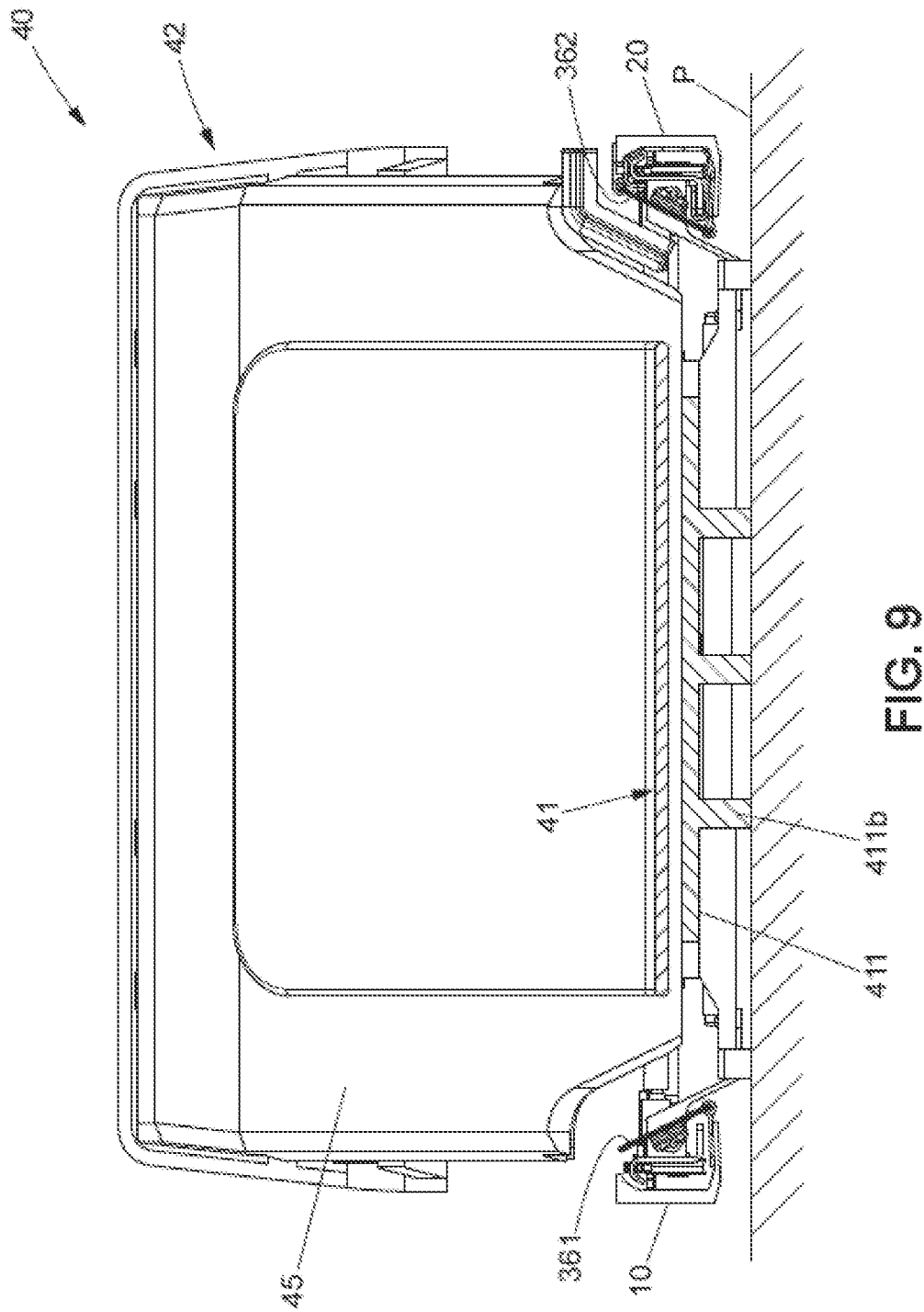
FIG. 9 is a section view along plane IX-IX of FIG. 8, showing the footrest and its positioning relative to the floor of the vehicle.

The base 411 may simply rest on the rear crossmember 441 and be hooked onto the rear crossmember 441, for example by hooking members 411a engaged on the rear crossmember 441, as can be seen in FIGS. 8 and 10. The base 411 may also rest on the floor P of the vehicle. The underside of the base 411 may further comprise ribs 411b parallel to the longitudinal direction X which facilitate the sliding of the base 411 on the vehicle floor (in particular on a carpet type of textile covering on the floor P, or similar), by reducing friction (due to the fact that the ribs reduce the contact surface area between the base 411 and the floor P of the vehicle). The free spaces between the ribs 411b may possibly be used for the passage of cables, in particular cables used to supply electric power to the footrest 40 or low voltage cables that are part of the connection technology of the footrest 40. These ribs 411b are visible in FIG. 8, which is a perspective bottom view of the footrest 40. FIG. 9 is a section view of FIG. 8 in a vertical transverse plane (YZ), which shows the relative position of the base 411 in relation to the floor P.

The hooking members 411a may be retained on the rear crossmember 441 by the resting of the base 421 on the hooking members 411a.

Figure 7:
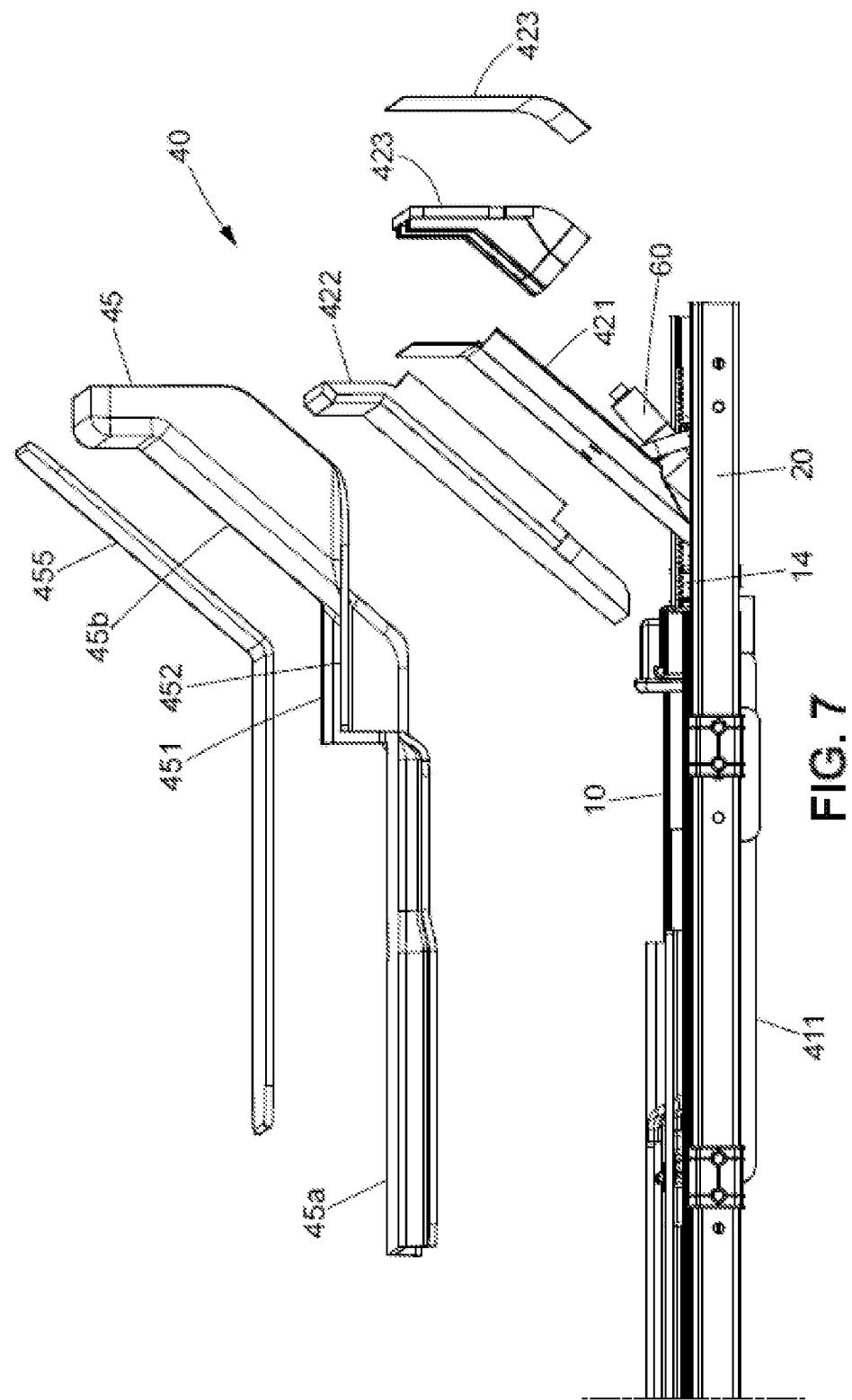
FIG. 7 is an exploded side view of the footrest of the vehicle seat support of FIG. 1, showing the different component elements of the footrest.

The extension 42 may comprise, in addition to the base 421, a plate 422 which covers the base 421, and members 423 which are located under the front end of the extension 42 and which reinforce and protect it. This front end of the extension 42, for example, curves upwardly to be vertical. The footrest 40 comprises, in addition to the body 41 and the extension 42, a rigid shell 45 (for example made of plastic). The shell 45 rests on the body 41 and the extension 42 which it covers. The shell 45 thus has a rear part 45a forming a second horizontal plate, and a front part 45b which is oblique and which extends parallel to the oblique part of the base 421 which it covers. The front part of this shell 45 extends transversely along the transverse axis Y from the first rail 10 to the second rail 20. The shell 45 is optionally covered with a protective or comfort layer 455, as illustrated in FIG. 7.

Figure 12:
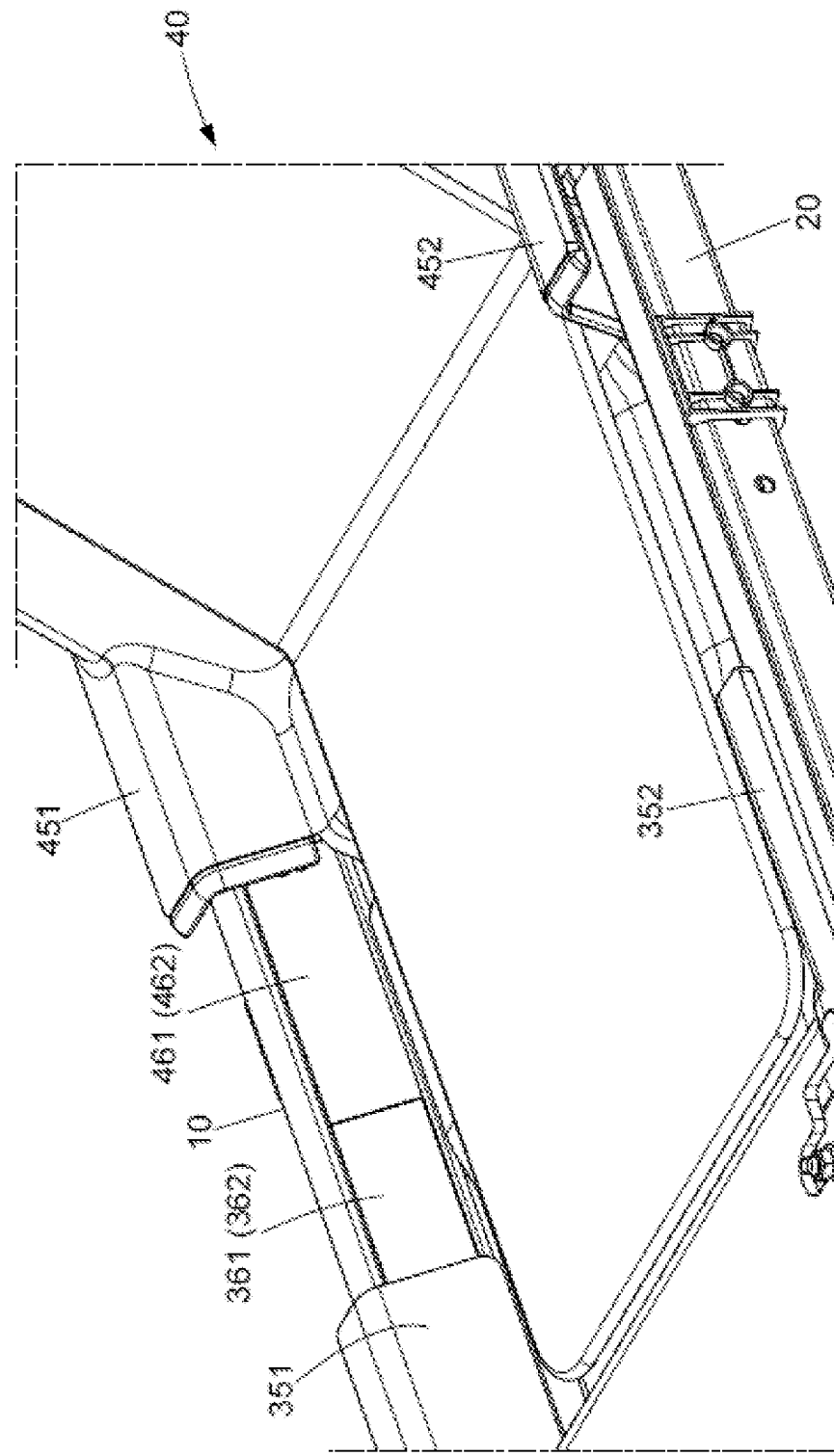
FIG. 12 is a perspective view of part of the vehicle seat support of FIG. 1, showing the flaps covering the rails.

At its lateral edge which covers the first rail 10, the shell 45 is extended rearwardly along this first rail 10 by a longitudinal protuberance 451. As illustrated in FIGS. 1, 7, and 12, this protuberance 451 covers part of the first rail 10, at least at the top and towards the interior of the vehicle seat support, and contributes, along with a secondary flap 461 (see below), to protecting the first rail 10. Longitudinal protuberance 451 covers at least the front end of secondary flap 461. Similarly, at its lateral edge which covers the second rail 20, the shell 45 is extended rearwardly along the second rail 20 by another longitudinal protuberance 452. This other protuberance 452 covers part of the second rail 20, at least at the top and towards the interior of the vehicle seat support, and contributes, along with a secondary flap 462 (see below), to protecting the second rail 20. Longitudinal protuberance 452 covers the front end of secondary flap 462. The longitudinal protuberances 451, 452 have an inner face which is directed towards the interior of the vehicle seat support and which covers the opening 13, 23 of the rail 10, 20, and an upper face which covers the upper part of the rail 10, 20. This inner face may be oblique, in particular if the opening 13, 23 of the rail 10, 20 opens obliquely upwards (at an angle to the transverse axis Y, as shown in the figures). Alternatively, this inner face may be vertical, in particular if the opening 13, 23 of the rail 10, 20 is open horizontally within the XY plane.

When the central module 30 and the footrest 40 are furthest from each other, the front edge of the first plate 35 and the rear edge of the shell 45 are located substantially at the same position along the longitudinal axis X, with the shell 45 partially engaged under the first plate 35. When the central module 30 and the footrest 40 are moved closer to each other by sliding along the rails (10, 20), the rear part of the shell 45 passes under the first plate 35 and is covered, partially or entirely, by this first plate 35. The footrest 40 can thus be brought closer to the central module 30, which improves the ergonomics of the assembly. In addition, the passenger's feet may also rest on the shell 45 and do not risk interfering with the sliding of the footrest 40 or of the central module 30. In addition, because the vehicle floor between the rails 10, 20 between the central module 30 and the longitudinal extension 42 is covered regardless of the relative position of the central module 30 and the footrest 40, this floor is protected from the entry of foreign objects between the rails 10, 20 which could interfere with the operation of the assembly.

The portion of each of the rails 10, 20 which is located between the central module 30 and the footrest 40 is covered by the abovementioned primary flap 361 and secondary flap 461, which may be made of plastic and which make it possible on the one hand to protect these rails by preventing foreign bodies from entering the internal space of a rail 10, 20 and hampering its operation, and on the other hand to prevent user injuries on the rails 10, 20.

Figure 13:
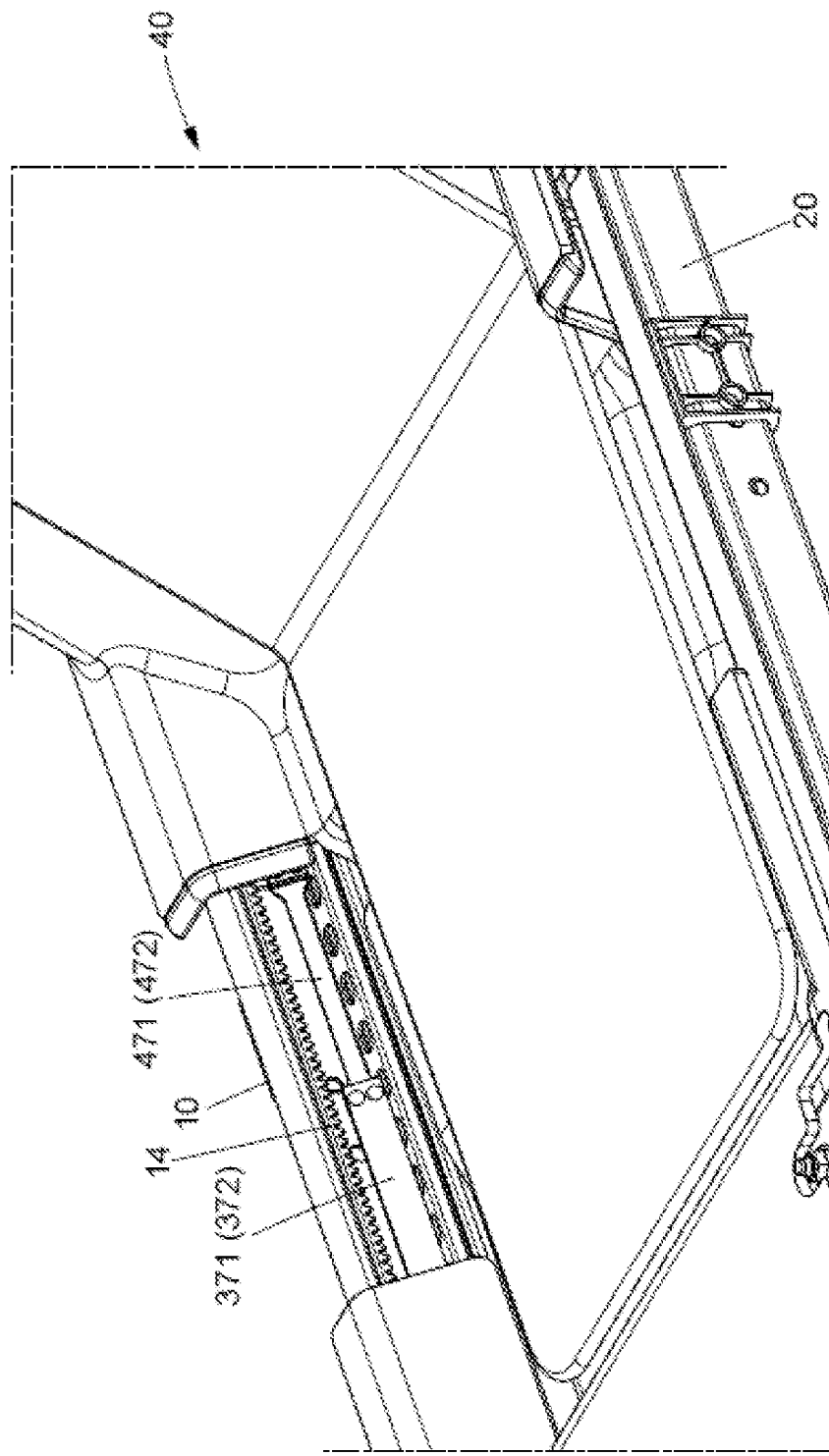
FIG. 13 is a view similar to FIG. 12, without the flaps.
Figure 14:
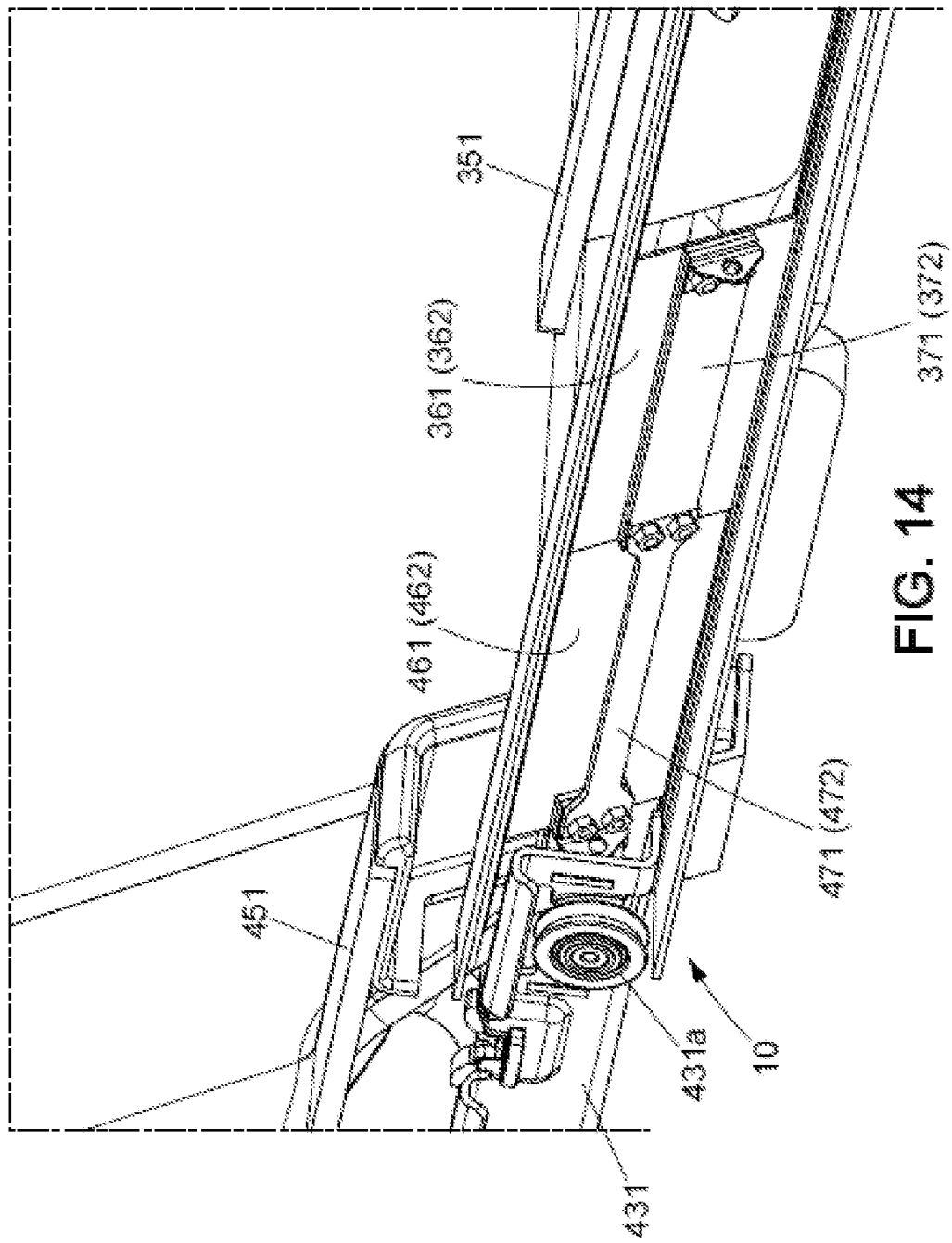
FIG. 14 is a perspective view showing the flaps, and the sliding and attachment mechanism of the flaps, of one of the rails of the vehicle seat support of FIG. 1.

We now describe a first embodiment of these flaps and their operating mechanism, for the first rail 10, with reference to FIGS. 12, 13, and 14. In this first embodiment, the primary flap 361 and secondary flap 461 are integral with one another and are attached to the footrest 40. For example, primary flap 361 may be supported by a primary frame 371 and secondary flap 461 may be supported by a secondary frame 471 which is attached to the primary frame and to the shuttle 431.

The flaps 361, 461 are parallel to the open face of the first rail 10, in other words obliquely relative to the transverse axis Y, in order to prevent the entry of foreign bodies into the internal space of the first rail 10. The oblique flaps 361, 461 may be extended by a horizontal extension which covers the top of the first rail 10 in order to protect it at the top as well.

Figure 15:
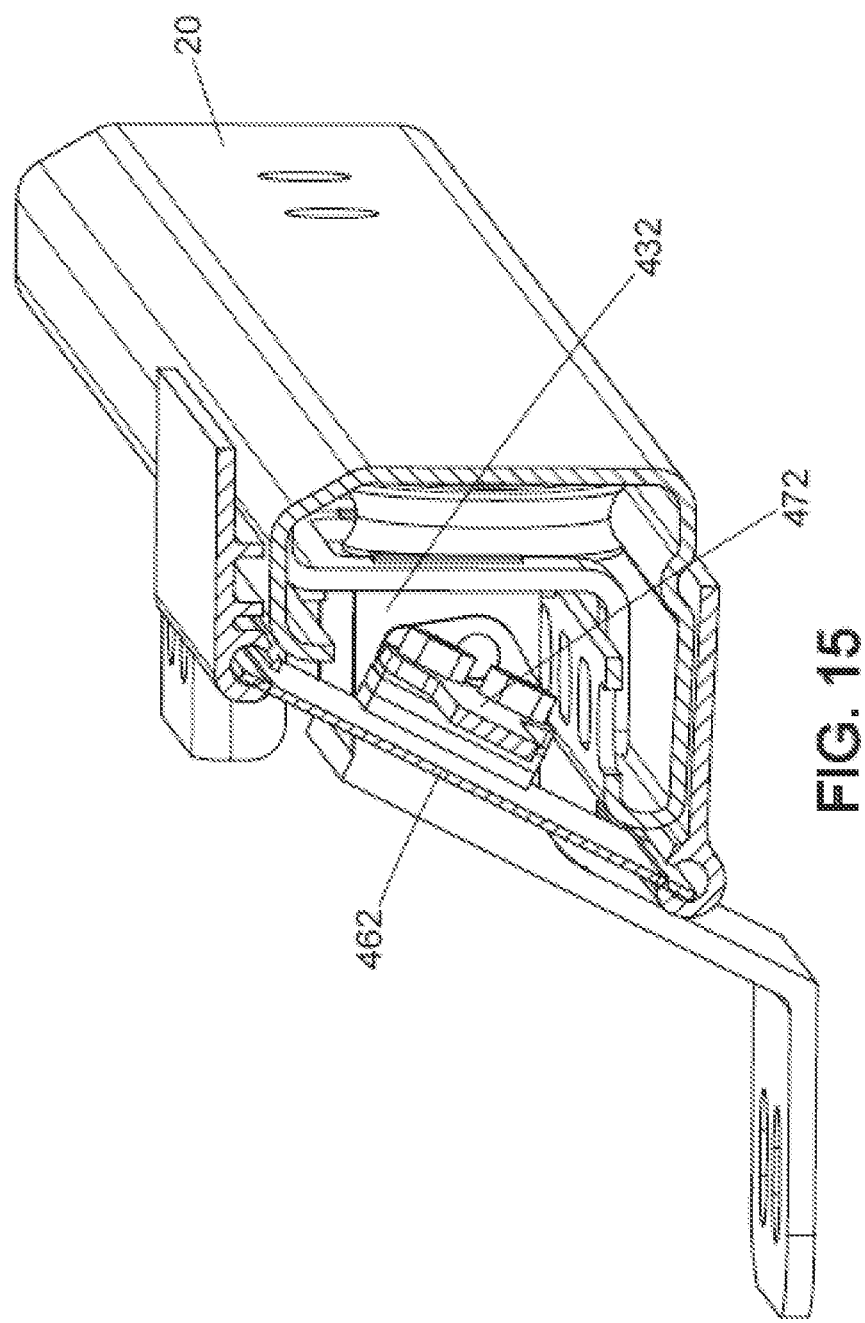
FIG. 15 is a perspective section view along plane XV-XV of FIG. 1.

FIG. 15 is a section view of the second rail 20 at the secondary flap 462, which shows the attachment of this secondary flap 462 to the secondary frame 472.

The front end of the secondary flap 462 may be partially covered by extension 451 of the shell 45, and in the position where the footrest 40 is furthest from the central module 30, the rear end of the primary flap 461 is substantially at the same level as the front end of extension 351, for example the rear end of the primary flap 461 may be partially engaged under the front end of extension 351.

When the central module 30 and the footrest 40 draw closer to each other, the primary flap 361 and then the secondary flap 461 slide under extension 351 and the lateral edge of the first plate 35.

Note that in this first embodiment, the primary flap 361 and secondary flap 461 could be replaced by a single flap.

We will now describe a second embodiment of these flaps and their operating mechanism, for the first rail 10, with reference to FIGS. 16 and 17. In this second embodiment, the primary flap 361 is attached to the central module 30 and the secondary flap 461 is attached to the footrest 40, these flaps being arranged to overlap.

For example, the primary flap 361 may be carried by a primary frame 371 connected to the slider 513, and the secondary flap 461 may be carried by a secondary frame 471 connected to the shuttle 431. The connection of the primary frame 371 to the slider 513 may be a resilient connection (spring or other resilient connection 381, enabling flap 361 and its frame 371 to slide rearward along the longitudinal direction X relative to the slider 513) while the connection of the secondary frame 471 to the shuttle 431 may be a rigid connection. Alternatively, the connection of the primary frame 371 to the slider 513 may be a rigid connection, while the connection of the secondary frame 372 to the shuttle 431 may be a resilient connection (spring or other resilient connection 381 (spring or other, enabling the flap 461 and its frame 471 to slide forward along the longitudinal direction X relative to the shuttle 431).

FIGS. 16 and 17 show the central module 30 and the footrest 40, respectively in a position as far apart from each other as possible and in a position as close to each other as possible. When the central module 30 and the footrest 40 move closer to each other, the flaps 361, 461 overlap until they almost completely cover each other, then flap 461 and its frame 471 come into abutment against flap 361 and frame 371 and push flap 361 and frame 371 rearward against the resilient biasing of the resilient connection 381 (the movement would be similar with forward displacement of flap 461 in the case where the resilient connection 381 would be between frame 471 and shuttle 431), enabling the shell 45 and the first plate 35 to come into contact with each other. When the central module 30 and footrest 40 move away from each other, the flaps and their frames follow a reverse movement, the return of flap 361 to the initial position being achieved by the resilient biasing of the resilient connection 381.

Alternatively, the two flaps 361, 461 could be respectively connected by resilient connections to the slider 513 and to the shuttle 431 and mounted so as to slide along the longitudinal direction X relative to the slider 513 and to the shuttle 431. In this case, the flaps 361, 461 do not need to overlap; they remain in axial abutment with one another and respectively disappear under the extensions 351, 451 when the central module (30) and footrest (40) draw closer to each other.

One will note that the flaps 361, 461 could be without frames, in particular when they are formed with a geometry and/or a material giving them sufficient rigidity.

The above descriptions of the mechanism of the flaps 361, 362 in the first embodiment and second embodiment have been provided for the first rail 10. As the assembly is symmetrical about a vertical plane (XZ) passing through its middle, the flap mechanism is identical for the primary flap 362 and secondary flap 462 which cover the second rail 20, and for their respective frames 372, and where appropriate the resilient connection 382. These latter references are indicated between parentheses in the relevant figures. Everything described above also applies to the second rail 20.

The primary frames 371, 372 and secondary frames 471, 472 may be at least partially housed in the respective rails 10, 20 and slide longitudinally with respect to the respective rails 10, 20.

In the above description, as illustrated in FIG. 1, the first plate 35 is located above the rails 10, 20, and the rear part of the shell 45 slides under the first plate 35, such that the rear part of the shell 45 is located between the rails 10, 20 (in the horizontal plane containing the rails). Alternatively, the rear part of the shell 45 could slide above the first plate 35.

The assembly further comprises an end module 80 which is attached to the rear ends 11, 21 of each of the rails 10, 20. This end module 80 will now be described with reference to FIGS. 19 to 22. This end module forms a transverse structure which secures together the rails 10, 20, which are also kept parallel by the central module 30 and the footrest 40 before the seat support is mounted in the vehicle, which allows mounting the seat support in the vehicle as a single module during construction of the vehicle.

This end module 80 extends transversely along the Y axis from the rear end 11 of the first rail 10 to the rear end 21 of the second rail 20. The end module 80 comprises a casing 83 provided with a cover 84. The casing 83 is attached at its right end to the rear end 11 of the first rail 10, and at its left end to the rear end 21 of the second rail 20. The adjectives "right" and "left" are defined with respect to the orientation and direction of the longitudinal X axis, such that the right side is towards the negative values of the transverse Y axis and the left side is towards the positive values of the transverse axis Y. Thus, in FIGS. 19 and 20, the first rail 10 is to the right of the longitudinal axis X, and the second rail 20 is to the left of the longitudinal axis X.

Figure 22:
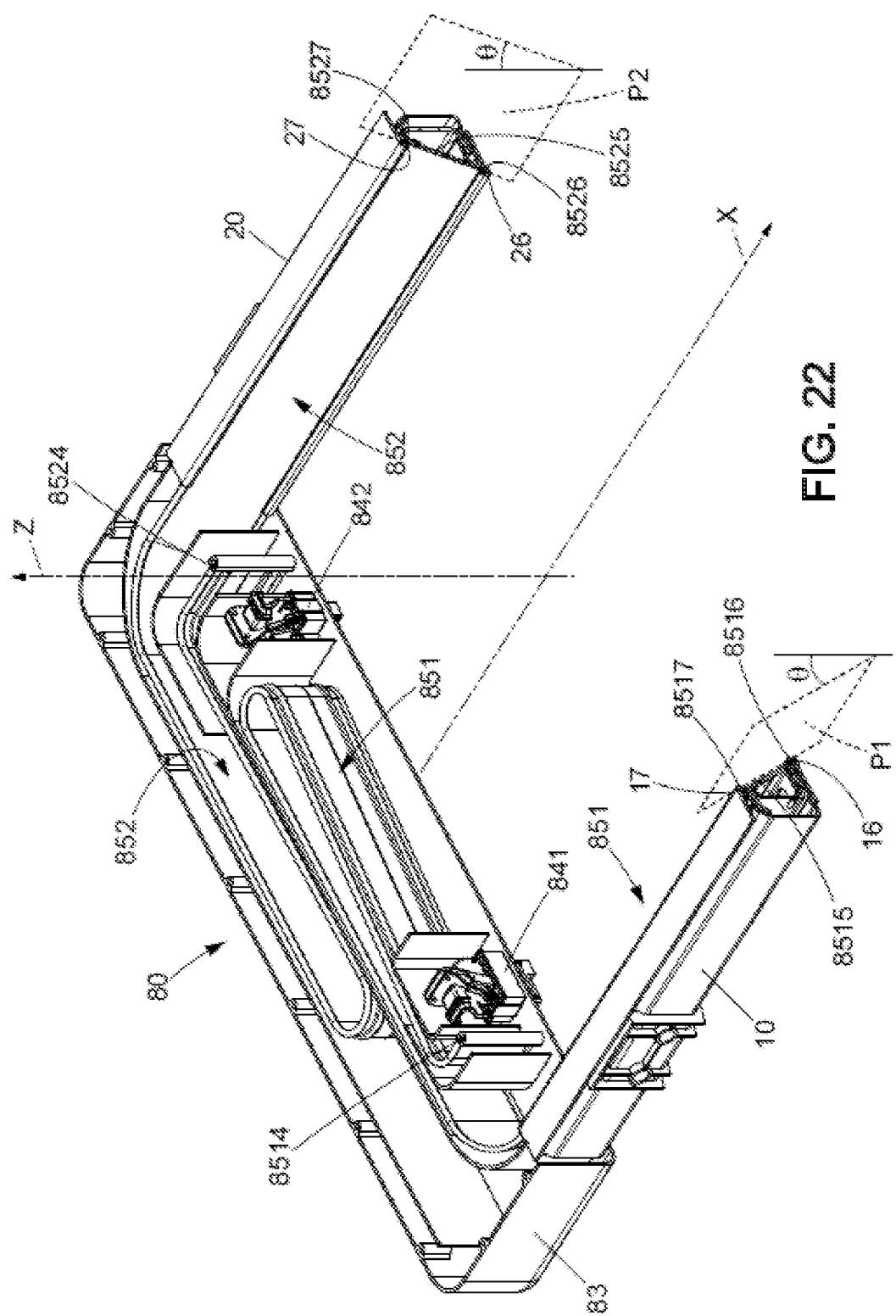
FIG. 22 is a perspective view of the rear end of the assembly of FIG. 19.

The end module 80 comprises a first connector 841 which is connected with the first belt 851, and a second connector 842 which is connected with the second belt 852. These connectors are shown in FIG. 22. Their function is detailed below.

Figure 19:
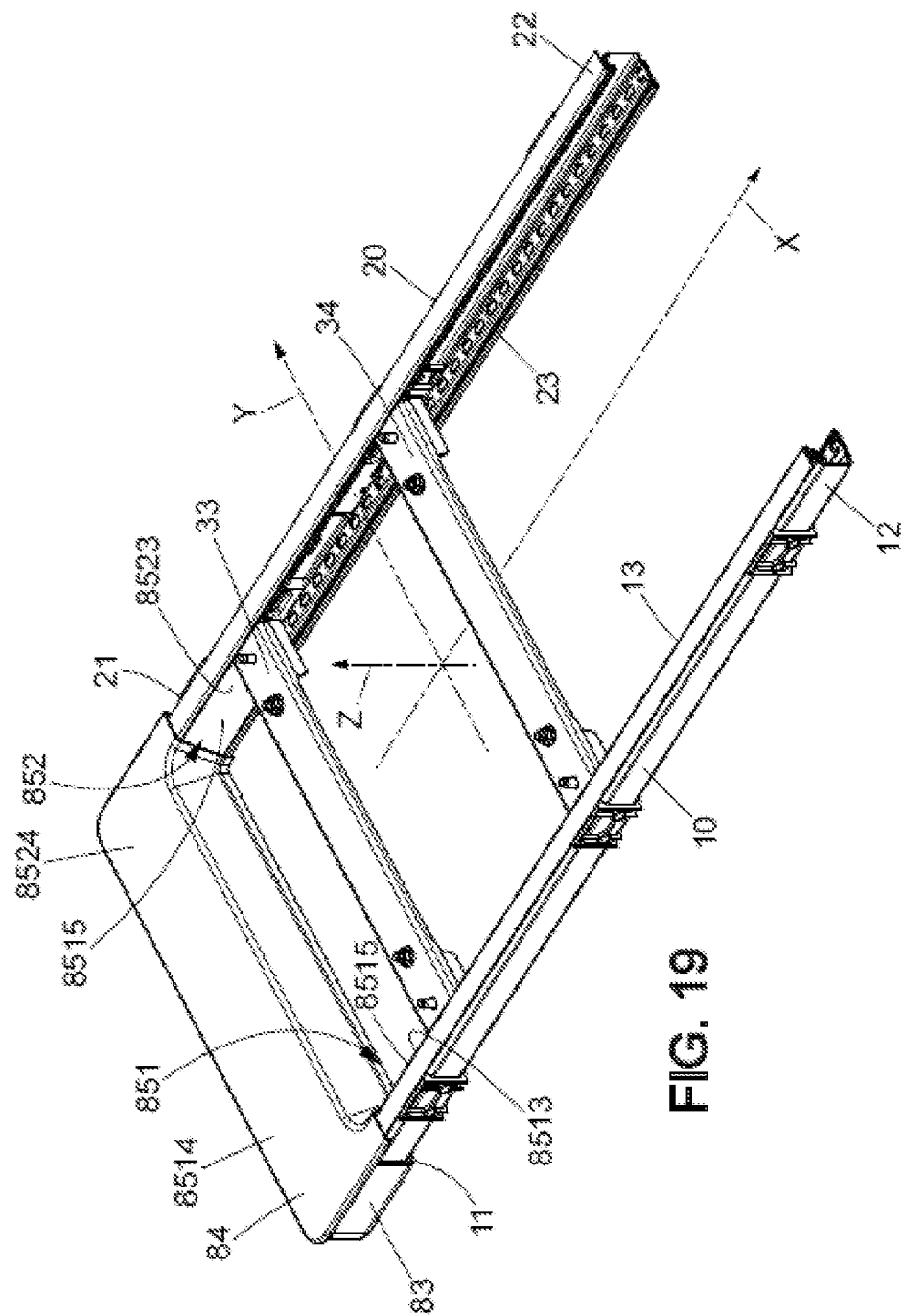
FIG. 19 is a perspective view of the rear part of the vehicle seat support of FIG. 1, with the central module in the rearward position.
Figure 20:
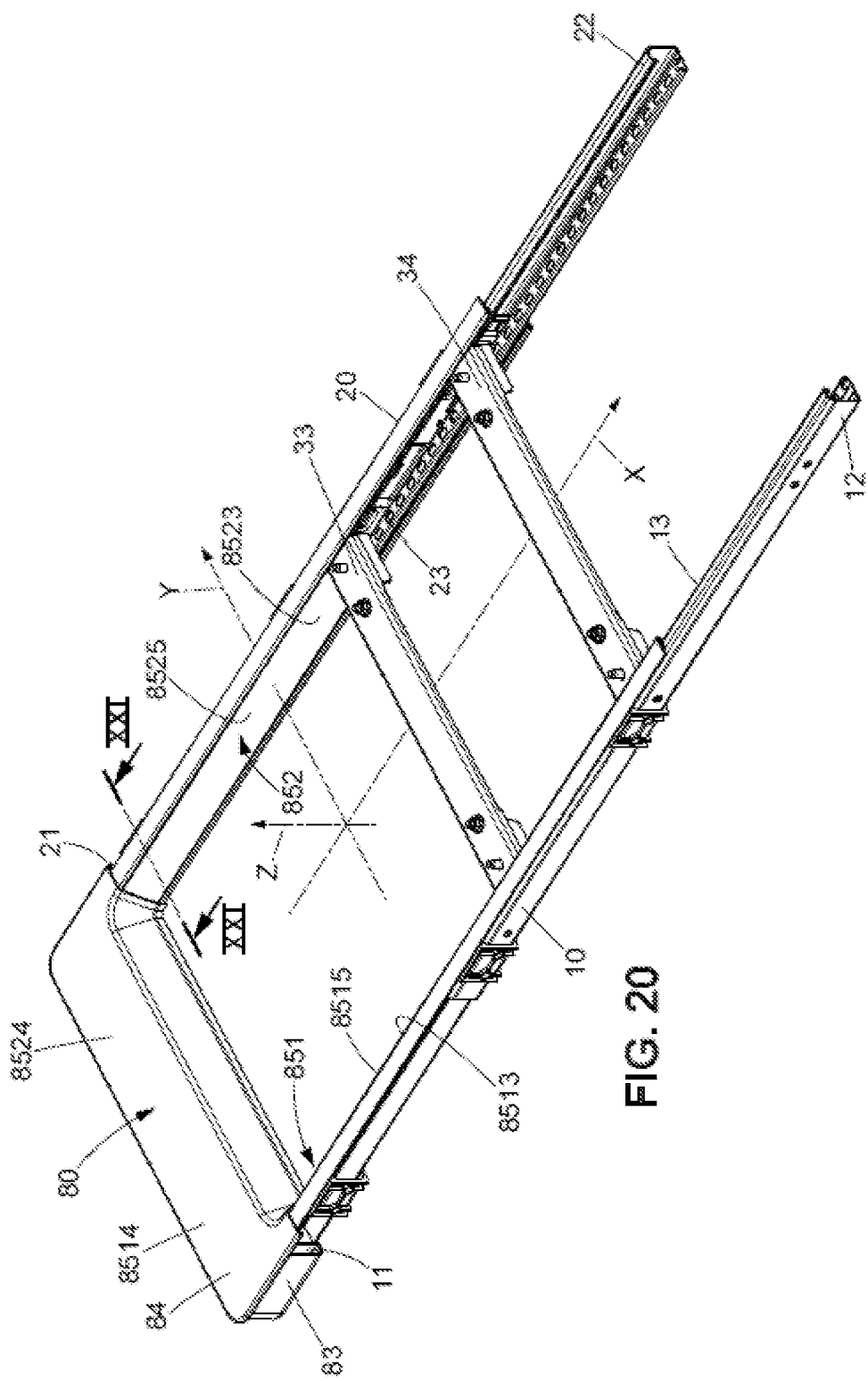
FIG. 20 is a perspective view of FIG. 19, with the central module in the forward position.
Figure 21:
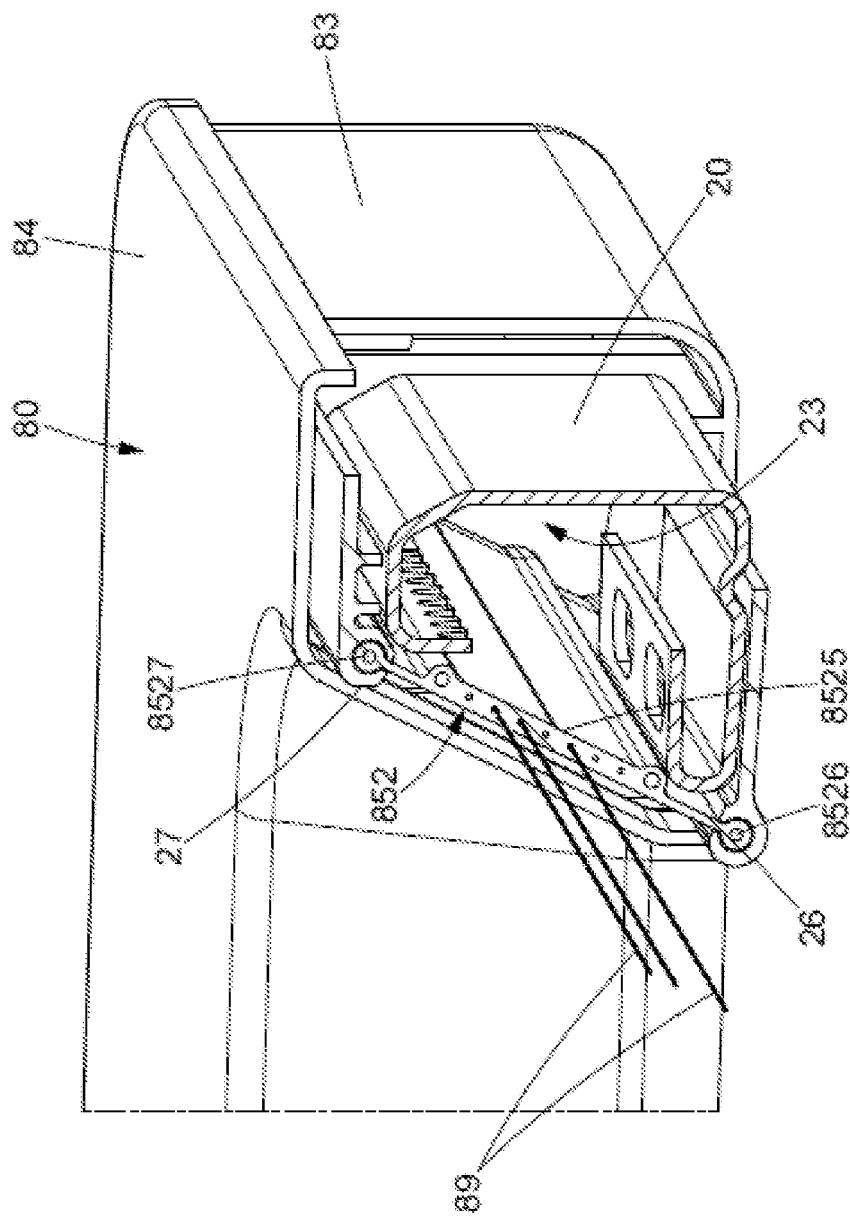
FIG. 21 is a perspective section view along plane XXI-XXI of FIG. 20.

The end module 80 comprises a first belt 851 and a second belt 852, which are partly housed in the casing 83. Each of these belts 851, 852 extends in a main direction, which is lengthwise to the belts, and has a width and a thickness. The first belt 851 is attached by one of its ends 8514 to the end module 80 and by the other of its ends 8513 to the central module 30. For example, as illustrated in FIG. 22 (where the cover 84 is omitted), the end 8514 of the first belt 851 is attached in the casing 83 to its right side, extends towards the left and folds back onto itself to return to the right side and exit through the right end of the casing 83 into the first rail 10. Similarly, the end 8524 of the second belt 852 is attached in the casing 83 to its left side, extends towards the right and folds back onto itself to return to the left side and exit through the left end of the casing 83 into the second rail 20. Thus, a major portion of the length of each of these belts (851, 852) is housed in the casing 83, by being folded or wound onto itself. When the central module 30 slides from its rearward position closest to the end module 80 which is shown in FIG. 19, to its forward position which is shown in FIG. 20, the first belt 851, its end 8513 being pulled by the central module 30, slides along the first rail 10. Similarly, the second belt 852, its end 8523 being pulled by the central module 30, slides along the second rail 20.

The belts 851, 852 protect the internal spaces of the rails (10, 20) from the entry of external foreign bodies which could interfere with sliding. The belts 851, 852 also have a function of supporting and guiding cables between the end module 80 and the central module 30 (see below).

The first belt 851 and second belt 852 are made of a material sufficiently flexible to be folded onto itself in the end module 80 and sufficiently rigid to slide freely in the rails 10, 20. This rigidity is a function of the width and thickness of the belts 851, 852.

For example, this material may be a metal. Alternatively, this material may be a polymer. For example, this material is an elastomer. In that case, the belts 851, 852 may be overmolded onto the cables 89.

Advantageously, the end module 80 is removably attached to the rails 10, 20. The assembly is thus easily configurable and repairable. For example, attachment is achieved by snap-fitting. During attachment, the right and left ends of the end module 80 are respectively attached to the rear end 11 of the first rail 10 and to the rear end 21 of the second rail 20. The first belt 851 and second belt 852 are then respectively inserted into the first rail 10 and second rail 20.

The first belt 851 slides along the first rail 10 so as to cover the entire first opening 13 between the end module 80 and the central module 30. Thus, the width of the first belt 851 is equal to the width of the first opening 13, measured in the plane (plane P1) within which this first opening 13 extends. Similarly, the second belt 852 slides along the second rail 20 so as to cover the entire second opening 23 between the end module 80 and the central module 30. Thus, the width of the second belt 852 is equal to the width of the second opening 23, measured in the plane (plane P2) within which this second opening 23 extends. For example, these two planes P1, P2 are vertical, in other words perpendicular to the transverse axis Y. Alternatively, as shown in the figures, these planes P1, P2 are oblique (each of these planes contains the longitudinal axis X and forms an angle θ with the vertical axis Z, these two planes forming a "V" between them whose vertex angle is equal to 2·θ). These planes and the angle θ are illustrated in FIG. 22. For example, the "V" is directed upwards (positive direction of the vertical axis Z).

The first opening 13 has a lower guide 16 along its lower edge, and has an upper guide 17 along its upper edge. For example, these guides are C-shaped tracks. The first belt 851 has a lower bead 8516 along its lower edge, and has an upper bead 8517 along its upper edge. The lower bead 8516 slides in the lower guide 16, and the upper bead 8517 slides in the upper guide 17. This sliding takes place when the central module 30 is moved relative to the end module 80. These guides (16, 17) and these beads (8516, 8517) are visible in FIG. 22.

Similarly, the second opening 23 has a lower guide 26 along its lower edge, and has an upper guide 27 along its upper edge. For example, these guides are C-shaped tracks. The second belt 852 has a lower bead 8526 along its lower edge, and has an upper bead 8527 along its upper edge. The lower bead 8526 slides in the lower guide 26, and the upper bead 8527 slides in the upper guide 27. This sliding takes place when the central module 30 is moved relative to the end module 80. These guides (26, 27) and these beads (8526, 8527) are visible in FIG. 22, and in FIG. 21.

The first belt 851 comprises a support 8515 which is able to guide cables 89 to the central module 30. Similarly, the second belt 852 comprises a support 8525 which is able to guide cables 89 to the central module 30. These cables 89 are visible in FIG. 21. The supports (8515, 8525) are members which are attached to the belts (851, 852), or which have been molded. These members run the full length of the belts (851, 852). Alternatively, these members are distributed regularly along the belts (851, 852). The cables 89 on the first belt 851 are connected at one end to the first connector 841 of the end module 80 then enter the first belt 851 at its first end 8514, and run along the first belt 851 to its second end 8513 in order to be connected to the central module 30. The cables 89 on the second belt 852 are connected at one end to the second connector 842 of the end module 80 then enter the second belt 852 at its first end 8524, and run along the second belt 852 to its second end 8523 in order to be connected to the central module 30.

For example, these members have longitudinal holes (meaning along the main direction of the belts 851, 852) through which the cables 89 can pass. The support 8525 of the second belt 852 is visible in FIG. 21.

The vehicle seat support which has just been described is in the form of a ready-to-use module, which may optionally be attached as one piece with all its elements pre-assembled (or only part of its elements pre-assembled) into the vehicle during construction. The electrical connection (power and advantageously control) of the actuation systems 50, 60 and advantageously of all electrical elements of the seat assembly, to the vehicle, can be done in a single operation during the mounting of the seat assembly on the floor P of the vehicle. This electrical connection can be done in a single operation, either with a single connector (not shown), or with several connectors (for example a power connector and a low voltage connector) (not shown) provided for example at the rear module 80.

A vehicle seat support comprising two rails (10, 20) extending in a longitudinal direction (X), a central module (30) slidably mounted on the rails and suitable for supporting the vehicle seat, a footrest (40) slidably mounted on the rails in front of the central module (30) and suitable for receiving the feet of an occupant seated on the seat, a first actuation system (50) able to cause the central module to slide along the rails, and a second actuation system (60) able to cause the footrest to slide along the rails independently of the central module.

The following numbered clauses include embodiments that are contemplated and non-limiting:

Clause 1. A vehicle seat support comprising:

a first rail (10) extending between a rear end (11) and a front end (12) in a longitudinal direction (X), a second rail (20) parallel to the first rail (10) and extending between a rear end (21) and a front end (22), the first rail (10) and the second rail (20) being intended to be attached to a floor of the vehicle, a central module (30) which is slidably mounted on the first rail (10) and second rail (20) and which is suitable for supporting the vehicle seat, a footrest (40) slidably mounted on the first rail (10) and second rail (20) between the respective front ends (12, 22) of the first and second rails (10, 20) and the central module (30), the footrest (40) being suitable for receiving the feet of an occupant seated on the seat, a first actuation system (50) able to cause the central module (30) to slide along the first rail (10) and second rail (20), and a second actuation system (60) able to cause the footrest (40) to slide along the first rail (10) and second rail (20) independently of the central module (30).

Clause 2. Vehicle seat support according to clause 1, wherein the central module (30) comprises a first plate (35) which is suitable for partially covering the floor of the vehicle, and the footrest (40) comprises a second plate (45*a*) which is suitable for partially covering the floor of the vehicle, the first plate (35) and second plate (45*a*) being arranged to overlap such that the floor of the vehicle is covered by the first plate (35) and the second plate (45*a*) between the central module (30) and the footrest (40) regardless of the relative position of the central module (30) and the footrest (40).

Clause 3. Vehicle seat support according to clause 1 or 2, wherein the first rail (10) and second rail (20) each comprise at least one flap (361, 362, 461, 462) respectively covering the rail (10, 20) between the central module (30) and the footrest (40).

Clause 4. Vehicle seat support according to clause 3, wherein the at least one flap (361, 362, 461, 462) is sized and arranged to entirely cover the rail (10, 20) between the central module (30) and the footrest (40).

Clause 5. Vehicle seat support according to clause 4, wherein the at least one flap (361, 362, 461, 462) is arranged obliquely relative to the horizontal, on an open face of the corresponding rail (10, 20).

Clause 6. Vehicle seat support according to any one of clauses 3 to 5, wherein the at least one flap (361, 362, 461, 462) is integral with a first member chosen among the central module (30) and the footrest (40) and is arranged to engage under a lateral portion (351, 352; 451, 452) integral with a second member chosen among the central module (30) and the footrest (40).

Clause 7. Vehicle seat support according to any one of clauses 3 to 5, wherein the first rail (10) and second rail (20) each comprise a first flap (361, 362) and a second flap (461, 462) which together cover the rail (10, 20) between the central module (30) and the footrest (40), the first flap (361, 362) and second flap (461, 462) respectively being connected to the central module (30) and to the footrest (40).

Clause 8. Vehicle seat support according to clause 7, wherein the first flap (361, 362) and second flap (461, 462) are mounted so as to overlap when the central module (30) and the footrest (40) move closer to each other.

Clause 9. Vehicle seat support according to clause 7 or clause 8, wherein the first flap (361, 362) is mounted so as to slide along the longitudinal direction (X) relative to the central module (30) and is resiliently biased towards the second flap (461, 462), and/or the second flap (461, 462) is mounted so as to slide along the longitudinal direction (X) relative to the footrest (40) and is resiliently biased towards the first flap (361, 362), the first flap and second flap being suitable for abutting axially against one another by causing the first flap (361, 362) and/or the second flap (461, 462) to slide when the central module (30) and the footrest (40) move closer to each other.

Clause 10. Vehicle seat support according to any one of the preceding clauses, wherein the first actuation system (50) comprises at least one motor (51, 52).

Clause 11. Vehicle seat support according to clause 10, wherein the first actuation system (50) comprises a first motor (51) suitable for driving the central module (30) on the first rail (10) and a second motor (52) suitable for driving the central module (30) on the second rail (20).

Clause 12. Vehicle seat support according to any one of the preceding clauses, wherein the second actuation system (60) comprises at least one motor (61).

Clause 13. Vehicle seat support according to clause 12, wherein the footrest (40) is mounted on a support (43) which comprises a first shuttle (431) able to slide on the first rail (10) and a second shuttle (432) able to slide on the second rail (20), the first shuttle (431) and the second shuttle (432) being interconnected by at least one rigid support structure (441, 442, 443), the motor (61) being carried by the rigid structure (441, 442, 443).

Clause 14. Vehicle seat support according to clause 13, wherein the support structure comprises at least one crossmember (442) integral with the two shuttles (431, 432), and the motor (61) is attached to the crossmember (442).

Clause 15. Vehicle seat support according to any one of the preceding clauses, wherein the first rail (10) and second rail (20) are secured together by at least one transverse structure (80) and are held parallel by the central module (30) and the footrest (40).

Clause 16. Vehicle seat support according to any one of the preceding clauses, wherein the central module (30) comprises a rigid structure (33, 34) which is integral with two sliders (513, 523) mounted so as to slide respectively along the two rails (10, 20).

Clause 17. Vehicle seat support according to any one of the preceding clauses, wherein the footrest (40) comprises a base (411) arranged to rest on the floor (P) of the vehicle, the base (411) comprising ribs (411*b*) parallel to the longitudinal direction (X) which facilitate the sliding of the base (411) on the floor (P) of the vehicle by reducing the contact surface area of the base (411) with the floor (P).

Clause 18. A seat assembly comprising a vehicle seat support according to any one of the preceding clauses and a vehicle seat (90) which is mounted on the central module (30).

Clause 19. Seat assembly according to claim 18, comprising an electronic control device able to control the two actuation systems (50, 60), the electronic control device allowing any one or more of the following configurations:

A "morphological adaptation" mode, in which the advancement, respectively the retreat, of the footrest (40) along the rails (10, 20) takes place with a retreat, respectively an advancement, of the seat (90).

A "preservation" mode, in which the advancement, respectively the retreat, of the footrest (40) along the rails (10, 20) takes place with an advancement, respectively a retreat, of the seat (90).

A "comfort" mode, in which the advancement (respectively the retreat) of the footrest (40) along the rails (10, 20) takes place with a retreat of the seat (90) and a rearward tilting of the backrest of the seat (90), respectively an advancement of the seat (90) and a forward tilting of the backrest of the seat (90).

Clause 20. A method for mounting an assembly according to claim 18, comprising at least the following steps:

preliminary assembling of a first assembly comprising the first rail (10), the second rail (20), a transverse structure (80) integrally secured to the first rail (10) and to the second rail (20), and at least one rigid support structure (33, 34; 43) that is part of the central module (30) or of the footrest (40), the support structure being integral with two members (513, 523; 431, 432) respectively slidably mounted on the first rail (10) and on the second rail (20), attachment of the first assembly to the floor (P) of the vehicle.

Clause 21. Method according to clause 20, wherein, during the preliminary assembling step, the central module (30) is mounted on the rails (10, 20) by a first rigid support structure (33, 34) integral with two sliders (513, 523) respectively slidably mounted on the first rail (10) and on the second rail (20), and the footrest (40) is mounted on the rails (10, 20) by a second rigid support structure (43) integral with two shuttles (431, 432) respectively slidably mounted on the first rail (10) and on the second rail (20).

Clause 22. Method according to clause 21, wherein, during the preliminary assembling step, the seat (90) is mounted on the central module (30).

Clause 23. Method according to any one of clauses 20 to 22, wherein, during the preliminary assembling step, at least one cable (89) is placed in at least one of the rails (10, 20), the at least one cable (89) being connected to the first actuation device (50) and to the second actuation device (60), and the at least one cable is connected to the vehicle during attachment of the first assembly to the floor (P) of the vehicle).

Clause 24. A method for making use of a seat assembly according to clause 18, comprising an electronic control device able to control the two actuation systems (50, 60) according to any one or more of the following configurations:

A "morphological adaptation" mode, in which the advancement, respectively the retreat, of the footrest (40) along the rails (10, 20) takes place with a retreat, respectively an advancement, of the seat (90).

A "preservation" mode, in which the advancement, respectively the retreat, of the footrest (40) along the rails (10, 20) takes place with an advancement, respectively a retreat, of the seat (90).

A "comfort" mode, in which the advancement, respectively the retreat, of the footrest (40) along the rails (10, 20) takes place with a retreat of the seat (90) and a rearward tilting of the backrest of the seat (90), respectively an advancement of the seat (90) and a forward tilting of the backrest of the seat (90).

The invention claimed is:

1. A vehicle seat support comprising:
   a first rail extending between a rear end and a front end in a longitudinal direction,
   a second rail parallel to the first rail and extending between a rear end and a front end, the first rail and the second rail being intended to be attached to a floor of the vehicle,
   a central module which is slidably mounted on the first rail and second rail and which is suitable for supporting the vehicle seat,
   a footrest slidably mounted on the first rail and second rail between the respective front ends of the first and second rails and the central module, the footrest being suitable for receiving the feet of an occupant seated on the seat,
   a first actuation system able to cause the central module to slide along the first rail and second rail,
   a second actuation system able to cause the footrest to slide along the first rail and second rail independently of the central module, and
   an electronic control device able to control the first and second actuation systems, the electronic control device allowing any one or more of the following configurations:
   a morphological adaptation mode, in which the advancement, respectively the retreat, of the footrest along the rails takes place with a retreat, respectively an advancement, of the seat,
   a preservation mode, in which the advancement, respectively the retreat, of the footrest along the rails takes place with an advancement, respectively a retreat, of the seat, and
   a comfort mode, in which the advancement (respectively the retreat) of the footrest along the rails takes place with a retreat of the seat and a rearward tilting of the backrest of the seat, respectively an advancement of the seat and a forward tilting of the backrest of the seat.

2. The vehicle seat support of claim 1, wherein the central module comprises a first plate which is suitable for partially covering the floor of the vehicle, and the footrest comprises a second plate which is suitable for partially covering the floor of the vehicle, the first plate and second plate being arranged to overlap such that the floor of the vehicle is covered by the first plate and the second plate between the central module and the footrest regardless of the relative position of the central module and the footrest.

3. The vehicle seat support of claim 1, wherein the first actuation system comprises at least one motor.

4. The vehicle seat support of claim 3, wherein the first actuation system comprises a first motor suitable for driving the central module on the first rail and a second motor suitable for driving the central module on the second rail.

5. The vehicle seat support of claim 1, wherein the second actuation system comprises at least one motor.

6. The vehicle seat support of claim 5, wherein the footrest is mounted on a support which comprises a first shuttle able to slide on the first rail and a second shuttle able to slide on the second rail, the first shuttle and the second shuttle being interconnected by at least one rigid support structure, the motor being carried by the rigid structure.

7. The vehicle seat support of claim 6, wherein the support structure comprises at least one crossmember integral with the two shuttles, and the motor is attached to the crossmember.

8. The vehicle seat support of claim 1, wherein the first rail and second rail are secured together by at least one transverse structure and are held parallel by the central module and the footrest.

9. The vehicle seat support of claim 1, wherein the central module comprises a rigid structure which is integral with two sliders mounted so as to slide respectively along the two rails.

10. A vehicle seat support comprising:
    a first rail extending between a rear end and a front end in a longitudinal direction,
    a second rail parallel to the first rail and extending between a rear end and a front end, the first rail and the second rail being intended to be attached to a floor of the vehicle,
    a central module which is slidably mounted on the first rail and second rail and which is suitable for supporting the vehicle seat,
    a footrest slidably mounted on the first rail and second rail between the respective front ends of the first and second rails and the central module, the footrest being suitable for receiving the feet of an occupant seated on the seat,
    a first actuation system able to cause the central module to slide along the first rail and second rail, and a second actuation system able to cause the footrest to slide along the first rail and second rail independently of the central module, wherein the first rail and second rail each comprise at least one flap respectively covering the rail between the central module and the footrest.

11. The vehicle seat support of claim 10, wherein the at least one flap is sized and arranged to entirely cover the rail between the central module and the footrest.

12. The vehicle seat support of claim 11, wherein the at least one flap is arranged obliquely relative to the horizontal, on an open face of the corresponding rail.

13. The vehicle seat support of claim 10, wherein the at least one flap is integral with a first member chosen among the central module and the footrest and is arranged to engage under a lateral portion integral with a second member chosen among the central module and the footrest.

14. The vehicle seat support of claim 10, wherein the first rail and second rail each comprise a first flap and a second flap which together cover the rail between the central module and the footrest, the first flap and second flap respectively being connected to the central module and to the footrest.

15. The vehicle seat support of claim 14, wherein the first flap and second flap are mounted so as to overlap when the central module and the footrest move closer to each other.

16. The vehicle seat support of claim 14, wherein the first flap is mounted so as to slide along the longitudinal direction relative to the central module and is resiliently biased towards the second flap, and/or the second flap is mounted so as to slide along the longitudinal direction relative to the footrest and is resiliently biased towards the first flap, the first flap and second flap being suitable for abutting axially against one another by causing the first flap and/or the second flap to slide when the central module and the footrest move closer to each other.

17. A vehicle seat support comprising:
a first rail extending between a rear end and a front end in a longitudinal direction,
a second rail parallel to the first rail and extending between a rear end and a front end, the first rail and the second rail being intended to be attached to a floor of the vehicle,
a central module which is slidably mounted on the first rail and second rail and which is suitable for supporting the vehicle seat,
a footrest slidably mounted on the first rail and second rail between the respective front ends of the first and second rails and the central module, the footrest being suitable for receiving the feet of an occupant seated on the seat,
a first actuation system able to cause the central module to slide along the first rail and second rail,
and a second actuation system able to cause the footrest to slide along the first rail and second rail independently of the central module,
wherein the footrest comprises a base arranged to rest on the floor of the vehicle, the base comprising ribs parallel to the longitudinal direction which facilitate the sliding of the base on the floor of the vehicle by reducing the contact surface area of the base with the floor.

18. A seat assembly comprising the vehicle seat support according to claim 1 and a vehicle seat which is mounted on the central module.

19. A method for mounting the seat assembly according to claim 18, comprising at least the following steps:
preliminary assembling of a first assembly comprising the first rail, the second rail, a transverse structure integrally secured to the first rail and to the second rail, and at least one rigid support structure that is part of the central module or of the footrest, the support structure being integral with two members respectively slidably mounted on the first rail and on the second rail and
attaching the first assembly to the floor of the vehicle.

20. The method of claim 19, wherein, during the preliminary assembling step, the central module is mounted on the rails by a first rigid support structure integral with two sliders respectively slidably mounted on the first rail and on the second rail, and the footrest is mounted on the rails by a second rigid support structure integral with two shuttles respectively slidably mounted on the first rail and on the second rail.

21. The method of claim 20, wherein, during the preliminary assembling step, the seat is mounted on the central module.

22. The method of claim 19, wherein, during the preliminary assembling step, at least one cable is placed in at least one of the rails, the at least one cable being connected to the first actuation device and to the second actuation device, and the at least one cable is connected to the vehicle during attachment of the first assembly to the floor of the vehicle.

* * * * *